US012609438B2

(12) United States Patent
Cai et al.

(10) Patent No.: US 12,609,438 B2
(45) Date of Patent: Apr. 21, 2026

(54) FOLDABLE ELECTRONIC DEVICE

(71) Applicant: HONOR DEVICE CO., LTD., Shenzhen (CN)

(72) Inventors: Xiaotao Cai, Shenzhen (CN); Dawei Zhou, Shenzhen (CN); Tiezhu Liang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 206 days.

(21) Appl. No.: 18/561,807

(22) PCT Filed: Feb. 2, 2023

(86) PCT No.: PCT/CN2023/074290
§ 371 (c)(1),
(2) Date: Nov. 17, 2023

(87) PCT Pub. No.: WO2024/060479
PCT Pub. Date: Mar. 28, 2024

(65) Prior Publication Data

US 2025/0096453 A1 Mar. 20, 2025

(30) Foreign Application Priority Data

Sep. 21, 2022 (CN) ......................... 202211150514.6

(51) Int. Cl.
*H01Q 1/22* (2006.01)
*H01Q 19/22* (2006.01)

(52) U.S. Cl.
CPC ........... *H01Q 1/2266* (2013.01); *H01Q 19/22* (2013.01)

(58) Field of Classification Search
None
See application file for complete search history.

(56) References Cited

U.S. PATENT DOCUMENTS

| | | | |
|---|---|---|---|
| 11,916,289 | B2 | 2/2024 | Chu et al. |
| 11,984,646 | B2 | 5/2024 | Wu et al. |
| 12,100,889 | B2 | 9/2024 | Li |
| 2012/0194390 | A1 | 8/2012 | Endo et al. |

(Continued)

FOREIGN PATENT DOCUMENTS

| | | |
|---|---|---|
| CN | 109449569 A | 3/2019 |
| CN | 109728412 A | 5/2019 |

(Continued)

OTHER PUBLICATIONS

Zhou Kai et al: "Design of ceramic antenna of multi-band MIMO mobile phone", Applied Science and Technology, vol. 47 No.2, Mar. 2020, 7 pages.

*Primary Examiner* — Crystal L Hammond

(57) ABSTRACT

This application provides a foldable electronic device, including two main bodies that are capable of being relatively folded or unfolded and a main antenna unit and a parasitic antenna unit that are respectively disposed on the two main bodies. The main antenna unit includes a radiation stub and a ground port disposed between two ends of the radiation stub. The parasitic antenna unit includes a parasitic stub and a ground return port, and the ground return port is disposed on the parasitic stub and is close to or located at one of end portions of the parasitic stub. When the electronic device is in a folded state, the parasitic stub overlaps the radiation stub.

18 Claims, 26 Drawing Sheets

(56) References Cited

U.S. PATENT DOCUMENTS

| | | | |
|---|---|---|---|
| 2012/0249393 A1 | 10/2012 | Hotta et al. | |
| 2017/0110786 A1* | 4/2017 | Liu | G06F 1/1641 |
| 2021/0218137 A1 | 7/2021 | Zhu | |
| 2021/0320402 A1 | 10/2021 | Li | |
| 2022/0166132 A1 | 5/2022 | Chu et al. | |
| 2022/0223999 A1* | 7/2022 | Wu | H04M 1/0268 |
| 2024/0055778 A1 | 2/2024 | Wang et al. | |

FOREIGN PATENT DOCUMENTS

| | | | |
|---|---|---|---|
| CN | 110233326 | A | 9/2019 |
| CN | 111584991 | A | 8/2020 |
| CN | 112151960 | A | 12/2020 |
| CN | 112563730 | A | 3/2021 |
| CN | 112701452 | A | 4/2021 |
| CN | 112993545 | A | 6/2021 |
| CN | 113991282 | A | 1/2022 |
| CN | 114597630 | A | 6/2022 |
| CN | 114614237 | A | 6/2022 |
| CN | 114696093 | A | 7/2022 |
| CN | 114824756 | A | 7/2022 |
| CN | 216903329 | U | 7/2022 |
| CN | 114845497 | A | 8/2022 |
| CN | 217215072 | U | 8/2022 |
| EP | 3905433 | A1 | 11/2021 |
| JP | 2016025480 | A | 2/2016 |
| WO | 2022117069 | A1 | 6/2022 |

* cited by examiner

FOLDABLE ELECTRONIC DEVICE

CROSS-REFERENCE TO RELATED APPLICATIONS

This application is a national stage of International Application No. PCT/CN2023/074290 filed on Feb. 2, 2023, which claims priority to Chinese Patent Application No. 202211150514.6 filed on Sep. 21, 2022. The disclosures of both of the aforementioned applications are hereby incorporated by reference in their entireties.

TECHNICAL FIELD

This application relates to the field of antenna technologies, and in particular, to a foldable electronic device.

BACKGROUND

With continuous development of terminal product forms, a foldable-screen device (for example, a foldable-screen mobile phone) is gradually widely used by users because a screen is significantly enlarged when the foldable-screen device is in an unfolded state. However, when an existing foldable-screen mobile phone is switched from an unfolded state to a folded state, because a body on a secondary-display side directly covers a body on a primary-display side, a radiation environment of an antenna on the primary-display side deteriorates, and current coupling occurs between a metal body on the secondary-display side and an antenna radiator on the primary-display side, causing an efficiency decrease to the antenna deployed on the primary-display side. Especially, when a gap between the body on the primary-display side and the body on the secondary-display side is relatively small, and a clearance radiation environment of the antenna on the primary-display side becomes increasingly smaller, antenna performance of the foldable-screen mobile phone in the folded state is greatly affected, and performance of a low-frequency antenna in the folded state is more greatly affected. Therefore, how to improve efficiency of the low-frequency antenna in the folded state has become a major concern of an antenna engineer.

SUMMARY

This application provides a foldable electronic device. In the electronic device, for a low-frequency antenna deployed on one of bodies of the electronic device, a parasitic antenna unit overlapping the low-frequency antenna in a folded state is constructed on the other body of the electronic device, so that a current generated by the parasitic antenna unit is in a same direction as a current generated in at least some areas of the low-frequency antenna, to reduce a radiation energy loss of the low-frequency antenna by using the currents superimposed in the same direction, and further improve radiation efficiency of the low-frequency antenna and improve communication performance of the electronic device.

According to a first aspect, this application provides a foldable electronic device. The foldable electronic device includes a first body, a second body, a main antenna unit, and a parasitic antenna unit. The first body and the second body are connected to each other and are capable of being relatively folded or unfolded. The main antenna unit is disposed on the first body. The main antenna unit includes a radiation stub, a feeding port, and a ground port. The feeding port is configured to feed the radiation stub. The radiation stub includes a first end and a second end. The ground port is disposed between the first end and the second end of the radiation stub. The parasitic antenna unit is disposed on the second body. The parasitic antenna unit includes a parasitic stub and a ground return port. The parasitic stub includes a first end portion and a second end portion. The ground return port is disposed on the parasitic stub and is close to or located at one of the end portions of the parasitic stub. When the electronic device is in a folded state, the parasitic stub overlaps the radiation stub. When the electronic device is in the folded state and the main antenna unit performs feeding, the main antenna unit is coupled to the parasitic antenna unit, so that a current generated on the parasitic stub is in a same direction as a current generated in at least some areas of the radiation stub.

In the electronic device provided in this application, for the main antenna unit (a low-frequency antenna) deployed on the first body of the electronic device, the parasitic antenna unit overlapping the main antenna unit in the folded state is constructed on the second body of the electronic device, and the current generated on the parasitic stub of the parasitic antenna unit is made to have the same direction as the current generated in at least some areas of the radiation stub of the main antenna unit, to reduce a radiation energy loss of the radiation stub by using the currents superimposed in the same direction, and further improve radiation efficiency of the main antenna unit in the folded state and improve communication performance of the electronic device.

In an implementation, both the first end and the second end of the radiation stub of the main antenna unit are open-circuit ends. When the electronic device is in the folded state, the first end portion of the parasitic stub is disposed opposite to the first end of the radiation stub, and the second end portion of the parasitic stub is disposed opposite to the second end of the radiation stub.

In an implementation, the radiation stub includes a first radiation area located between the ground port and the first end of the radiation stub and a second radiation area located between the ground port and the second end of the radiation stub. The ground return port of the parasitic antenna unit is close to or located at the second end portion of the parasitic stub, and the parasitic stub includes a main radiation area located between the ground return port and the first end portion of the parasitic stub. When the electronic device is in the folded state and the main antenna unit performs feeding, the main antenna unit is coupled to the parasitic antenna unit, so that a current generated in the main radiation area of the parasitic stub is in a same direction as a current generated in the first radiation area of the radiation stub.

In an implementation, the radiation stub includes a first radiation area located between the ground port and the first end of the radiation stub and a second radiation area located between the ground port and the second end of the radiation stub. The ground return port of the parasitic antenna unit is close to or located at the first end portion of the parasitic stub, and the parasitic stub includes a main radiation area located between the ground return port and the second end portion of the parasitic stub. When the electronic device is in the folded state and the main antenna unit performs feeding, the main antenna unit is coupled to the parasitic antenna unit, so that a current generated in the main radiation area of the parasitic stub is in a same direction as a current generated in the second radiation area of the radiation stub.

In an implementation, a resonance frequency of the parasitic antenna unit is less than a resonance frequency of the main antenna unit, so that the parasitic antenna unit is used to improve radiation efficiency of the main antenna unit in the folded state.

In an implementation, a main resonant mode of the main antenna unit is a ½ wavelength common-mode resonant mode, and a resonant mode of the parasitic antenna unit is a ¼ wavelength resonant mode.

In an implementation, the parasitic antenna unit further includes a ground return structure electrically connected to the ground return port of the parasitic stub, the ground return port of the parasitic stub is grounded by using the ground return structure, and the ground return structure is configured to construct a low-impedance boundary on the parasitic stub.

The ground return structure is a low-impedance circuit including several passive devices. Optionally, the ground return structure includes a plurality of low-impedance circuits disposed in parallel and switch devices electrically connected to the plurality of low-impedance circuits, where each low-impedance circuit includes several passive devices, and the switch devices are configured to control connected/disconnected states of the plurality of low-impedance circuits. The passive device includes a zero-ohm resistor, a large capacitor, or a small inductor, so that a low-impedance boundary can be constructed on the parasitic stub to form a ground return point.

In an implementation, the main antenna unit further includes a first tuning unit electrically connected to the radiation stub, and the first tuning unit is configured to adjust the resonance frequency of the main antenna unit, so that the main antenna unit operates on a preset target frequency band. It may be understood that, the resonance frequency of the main antenna unit is adjusted by using the first tuning unit, so that the main antenna unit can cover different target frequency bands at different moments, for example, a B28 frequency band, a B5 frequency band, or a B8 frequency band in a low frequency band, to meet an actual design requirement.

The parasitic antenna unit further includes a second tuning unit electrically connected to the parasitic stub, and the second tuning unit is configured to adjust the resonance frequency of the parasitic antenna unit, so that the resonance frequency of the parasitic antenna unit is less than the resonance frequency of the main antenna unit. It may be understood that, the resonance frequency of the parasitic antenna unit is adjusted by using the second tuning unit, so that the resonance frequency of the parasitic antenna unit can be correspondingly adjusted as the resonance frequency of the main antenna unit changes, to meet an actual design requirement. For example, a proper frequency spacing is maintained between the resonance frequency of the parasitic antenna unit and the resonance frequency of the main antenna unit, to improve radiation efficiency of the main antenna unit in the folded state.

In an implementation, the first body includes a first metal bezel, and the second body includes a second metal bezel. The radiation stub is disposed on the first metal bezel, and the parasitic stub is disposed on the second metal bezel.

In an implementation, a first gap and a second gap are disposed on the first metal bezel, and a metal bezel between the first gap and the second gap forms the radiation stub of the main antenna unit, where the first end of the radiation stub is adjacent to the first gap, and the second end of the radiation stub is adjacent to the second gap.

A third gap and a fourth gap are disposed on the second metal bezel, and the parasitic stub of the parasitic antenna unit is formed on a metal bezel between the third gap and the fourth gap, where the first end portion of the parasitic stub is adjacent to the third gap, and the second end portion of the parasitic stub is adjacent to the fourth gap.

When the electronic device is in the folded state, the first gap is disposed opposite to the third gap, and the second gap is disposed opposite to the fourth gap. In this way, it can be ensured that the parasitic stub can overlap the radiation stub when the electronic device is in the folded state.

In an implementation, the electronic device further includes a connecting structure, and the first body and the second body are connected by using the connecting structure. The first metal bezel includes a first connecting segment, a second connecting segment, and a third connecting segment, and the first connecting segment is disposed opposite to the connecting structure; and the second connecting segment and the third connecting segment each are connected to the first connecting segment, and each are located between the first connecting segment and the connecting structure.

In an implementation, the radiation stub each is like an L-shaped strip. The first gap is disposed on the first connecting segment of the first metal bezel, and the second gap is disposed on the second connecting segment or the third connecting segment of the first metal bezel.

In an implementation, the feeding port is disposed on the first connecting segment.

Optionally, when the second gap is disposed on the second connecting segment of the first metal bezel, the feeding port is disposed on the second connecting segment: or when the second gap is disposed on the third connecting segment of the first metal bezel, the feeding port is disposed on the third connecting segment.

In an implementation, the radiation stub is like a linear strip. The first gap and the second gap both are disposed on the first connecting segment of the first metal bezel, or both are disposed on the second connecting segment of the first metal bezel, or both are disposed on the third connecting segment of the first metal bezel.

BRIEF DESCRIPTION OF DRAWINGS

To describe technical solutions in embodiments of this application more clearly, the following briefly describes accompanying drawings that need to be used in embodiments of this application. It is clear that the accompanying drawings in the following descriptions show merely some embodiments of this application, and a person of ordinary skill in the art may still derive other accompanying drawings from these accompanying drawings without creative efforts.

DESCRIPTION OF REFERENCE SIGNS OF MAIN ELEMENTS

| | |
|---|---|
| Electronic device | 100 |
| First body | 11 |
| Second body | 12 |
| Connecting structure | 13 |
| First display | 21 |
| Second display | 22 |
| Bezel | 30 |
| First metal bezel | 31 |
| First gap | G1 |
| Second gap | G2 |
| First connecting segment | T1 |
| Second connecting segment | T2 |
| Third connecting segment | T3 |
| Second metal bezel | 32 |
| Third gap | G3 |
| Fourth gap | G4 |
| Fourth connecting segment | T4 |
| Fifth connecting segment | T5 |
| Sixth connecting segment | T6 |
| Low-frequency antenna | 41 |
| Radiation stub | 411, 511 |
| First end | M1 |
| Second end | M2 |
| Feeding port | 412, 512 |
| Ground port | 413, 513 |
| First tuning unit | 414, 514 |
| Conductor | 42 |
| Antenna structure | 50 |
| Main antenna unit | 51 |
| Parasitic antenna unit | 52 |
| Parasitic stub | 521 |

-continued

| | |
|---|---|
| First end portion | N1 |
| Second end portion | N2 |
| Ground return port | 522 |
| Ground return structure | 523 |
| First low-impedance circuit | D1 |
| Second low-impedance circuit | D2 |
| Third low-impedance circuit | D3 |
| First switch unit | K1 |
| Second switch unit | K2 |
| Third switch unit | K3 |
| Resistor | R1 |
| Capacitor | C1 |
| Inductor | L1 |
| Second tuning unit | 524 |
| Feed | 61 |
| Edge area | A1, A2 |
| Gap | G0 |
| First circuit board | 71 |
| Second circuit board | 72 |
| First floor | 81 |
| Second floor | 82 |
| First viewing angle | V1 |
| Second viewing angle | V2 |
| Slot | S1, S2 |
| Dashed-line box | F1, F2, F3, F4, F5 |
| Position | P1, P2 |
| First radiation area | P1-M1 |
| Second radiation area | P1-M2 |
| Main radiation area | P2-N1, P2-N2 |

This application is further described in the following specific implementations with reference to the accompanying drawings.

DESCRIPTION OF EMBODIMENTS

The following clearly and completely describes technical solutions in embodiments of this application with reference to the accompanying drawings in embodiments of this application. The accompanying drawings are for illustrative descriptions only, and are merely schematic drawings, and cannot be construed as limitation on this application. It is clear that the described embodiments are merely some but not all of embodiments of this application. Based on the embodiments of this application, all other embodiments obtained by a person of ordinary skill in the art without creative efforts fall within the protection scope of this application.

Unless otherwise defined, meanings of all technical and scientific terms used in this application are the same as meanings usually understood by a person skilled in the art. Terms used in the specification of this application are merely intended to describe specific embodiments but not intended to limit this application.

Figure 1:
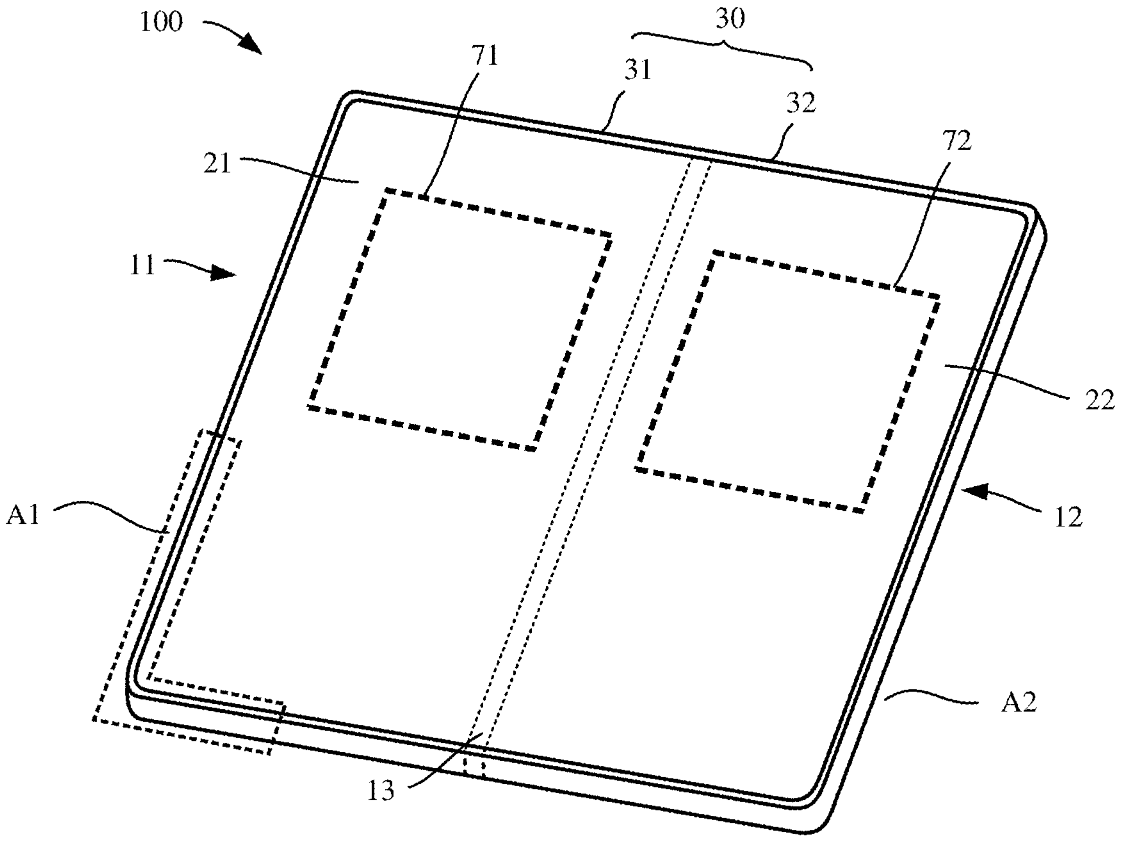
FIG. 1 is a schematic diagram of a structure of a foldable electronic device, where the electronic device is in an unfolded state.
Figure 2:
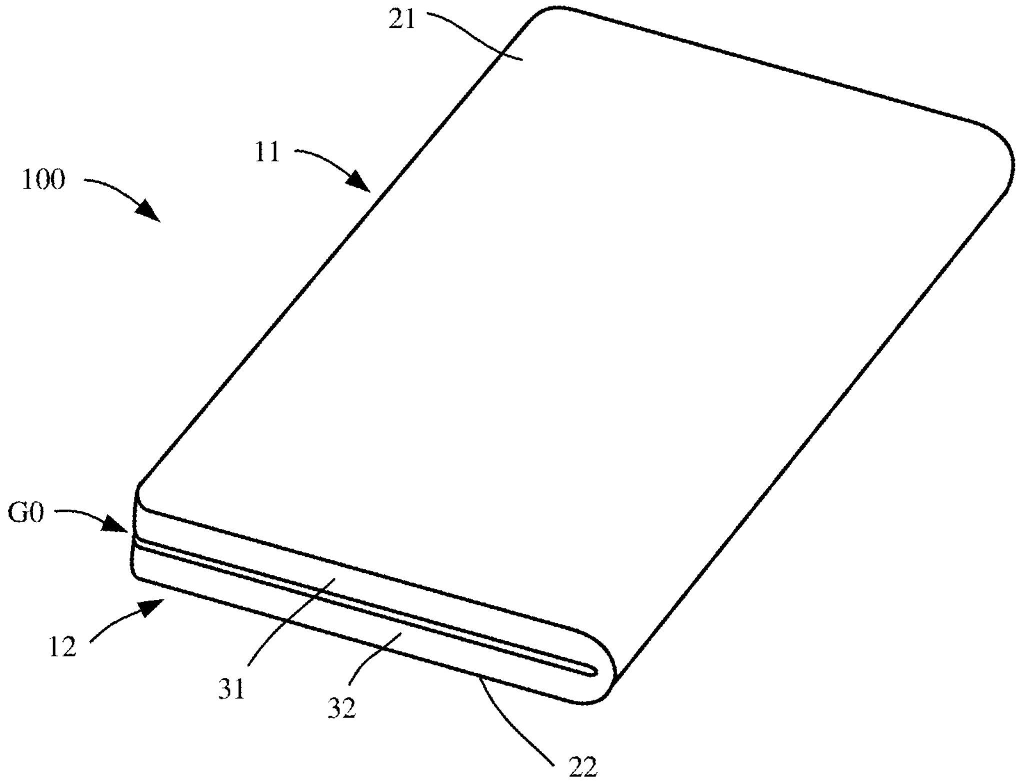
FIG. 2 is a schematic diagram of a structure of the electronic device shown in FIG. 1 in a folded state.

As shown in FIG. 1 and FIG. 2, a foldable electronic device 100 includes a first body 11 and a second body 12. The first body 11 and the second body 12 are connected to each other and are capable of being relatively folded and unfolded, so that the electronic device 100 has two use states: folded and unfolded. In the unfolded state, as shown in FIG. 1, a first display 21 on the first body 11 and a second display 22 on the second body 12 can form a complete display plane, so that the electronic device 100 has a display with a large area, to implement a function of large-screen display, and meet a use requirement of a user for large-screen display. In the folded state, as shown in FIG. 2, the first display 21 and the second display 22 are located on different planes, so that the electronic device 100 has a display with a small area, and can meet a use requirement of a user for ease of carrying. In an implementation, the first display 21 may be set as a primary display, and the second display 22 may be set as a secondary screen. In another implementation, alternatively, the first display 21 may be set as a secondary display, and the second display 22 may be set as a primary display. In the folded state, the first display 21 and the second display 22 may be hidden on an inner side of the electronic device 100, or may be exposed to an outer side of the electronic device 100. A presentation manner, of the first display 21 and the second display 22, used when the electronic device 100 is in the folded state is not specifically limited in this application. The electronic device 100 includes but is not limited to a mobile phone, a tablet computer, a notebook computer, a wearable device, and another electronic apparatus.

In this embodiment, the electronic device 100 further includes a connecting structure 13 disposed between the first body 11 and the second body 12. The first body 11 and the second body 12 are connected by using the connecting structure 13, and at least one body can rotate relative to the connecting structure 13, so that a use state of the first body 11 and the second body 12 can be switched between the unfolded state and the folded state. The connecting structure 13 may be a rotating shaft, a hinge, or another structure. A specific structure of the connecting structure 13 is not specifically limited in this application.

Figure 3A:
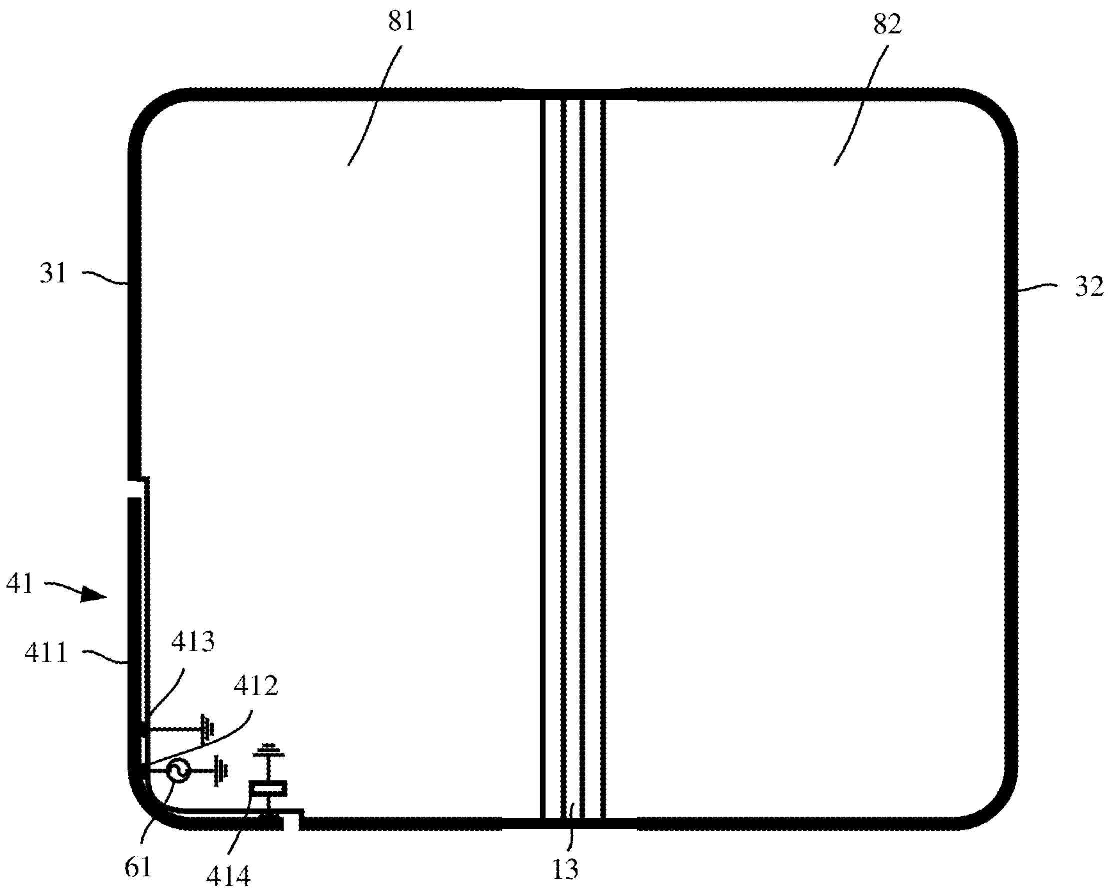
FIG. 3A is a schematic diagram of a structure of an application environment of a low-frequency antenna, where the low-frequency antenna is disposed on a bezel included in the electronic device shown in FIG. 1, and the bezel is in an unfolded state.
Figure 3B:
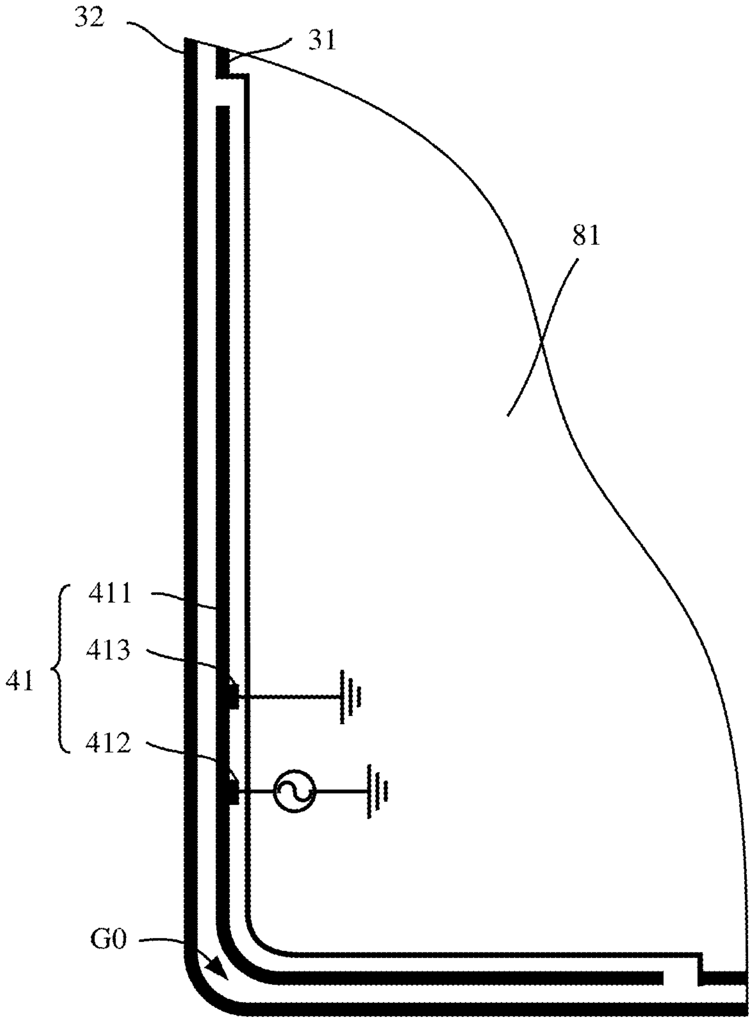
FIG. 3B is an enlarged schematic diagram of a local structure of the bezel shown in FIG. 3A, where the bezel is in a folded state.

The electronic device 100 further includes a housing. The housing forms an accommodating cavity together with the first display 21 and the second display 22 through enclosure, so as to accommodate internal structures of the electronic device 100, such as a circuit board assembly, a battery module, a processor, and a radio frequency module. The housing includes a bezel 30, a middle frame (not shown in the figure), and a rear cover (not shown in the figure). The bezel 30 includes a first metal bezel 31 on the first body 11 and a second metal bezel 32 on the second body 12. The first bezel 30 is fixedly connected to a middle frame or a rear cover on the first body 11, or the first bezel 30 is formed integrally with a middle frame or a rear cover on the first body 11. Similarly, the second bezel 30 is fixedly connected to a middle frame or a rear cover on the second body 12, or the second bezel 30 is integrally formed with a middle frame or a rear cover on the second body 12. As shown in FIG. 2 and FIG. 3B, when the electronic device 100 is in a fully folded state, the first body 11 and the second body 12 overlap, so that the first metal bezel 31 and the second metal bezel 32 overlap.

It should be noted that, FIG. 1 and FIG. 2 schematically show merely some structural components included in the electronic device 100. Actual constructions and positions of the structural components are not limited by FIG. 1 and FIG. 2. In addition, in comparison with the structural components shown in FIG. 1 and FIG. 2, the electronic device 100 may actually include more structural members. For example, the electronic device 100 may further include devices such as a camera, a fingerprint module, a controller, a first circuit board 71 disposed in the first body 11, and a second circuit board 72 disposed in the second body 12.

In this embodiment, the electronic device 100 further has a wireless communication function. Correspondingly, the electronic device 100 further includes several antennas. The antenna is configured to transmit and receive an electromagnetic wave signal. In an embodiment, as shown in FIG. 1 and FIG. 3A, the antenna includes a low-frequency antenna 41 disposed on one of the bodies of the electronic device 100. The low-frequency antenna 41 includes a radiation stub 411, a feeding port 412, a ground port 413, and a first tuning unit 414. The feeding port 412 is configured to be electrically connected to a feed 61, and the feed 61 is configured to feed the radiation stub 411 by using the feeding port 412. The ground port 413 is electrically connected to a first floor 81 on the first body 11, to implement grounding of the radiation stub 411. In the embodiment, the ground port 413 is disposed between two ends of the radiation stub 411. The first tuning unit 414 is electrically connected to the radiation stub 411, and the first tuning unit 414 is configured to adjust a resonance frequency of the low-frequency antenna 41, so that the low-frequency antenna 41 operates on a preset target frequency band. In the embodiment, the target frequency band is a low frequency band, for example, a B28 frequency band (703 MHZ-803 MHZ), a B5 frequency band (824 MHz-894 MHZ), or a B8 frequency band (880 MHz-960 MHz) in the low frequency band. Correspondingly, an electromagnetic wave signal fed by the feed 61 to the radiation stub 411 is a low-frequency electrical signal. In this application, the low-frequency antenna 41 is described by using an example in which the low-frequency antenna 41 operates on the B5 frequency band and the resonance frequency is 0.85 GHz.

Because the antenna is a metal material, radiation performance of the antenna is prone to interference from electronic components such as a battery, an oscillator, and a camera, or interference from another metal object. Therefore, a clear space (referred to as a clearance space for short) is usually reserved in a surrounding space of the antenna, to ensure the radiation performance of the antenna. In this application, the low-frequency antenna 41 is described by using an example in which the low-frequency antenna 41 is disposed in an edge area A1 (shown in FIG. 1) of the first body 11. In the embodiment, as shown in FIG. 3A, slotting is performed on the first metal bezel 31 to form the radiation stub 411.

As shown in FIG. 2-FIG. 3B, when the electronic device 100 is in the folded state, the first body 11 and the second body 12 overlap each other, so that the second metal bezel 32 covers the radiation stub 411, and the first floor 81 on the first body 11 and a second floor 82 on the second body 12 are switched from an unfolded state to a folded state. Consequently, a clearance radiation environment of the low-frequency antenna 41 deteriorates. It should be noted that, the first floor 81 mentioned in this application refers to a combination constituted by several metal components on the first body 11, such as a metal middle frame, a metal rear cover, and the first circuit board 71 that are on the first body 11. Similarly, the second floor 82 refers to a combination constituted by several metal components on the second body 12, for example, a metal middle frame, a metal rear cover, and the second circuit board 72 that are on the second body 12. For ease of illustration in FIG. 3A and ease of understanding, in this application, the first floor 81 and the second floor 82 are represented by using a complete block-shaped equivalent structure.

Because the low-frequency antenna 41 is affected by coupling of the second floor 82 on the second body 12, antenna radiation performance of the low-frequency antenna 41 in the folded state significantly deteriorates. Especially, when a spacing between the first body 11 and the second body 12 that are folded is relatively small and a clearance area around the low-frequency antenna 41 is also relatively small, performance of the antenna operating in the low frequency band is more significantly affected.

Figure 4A:
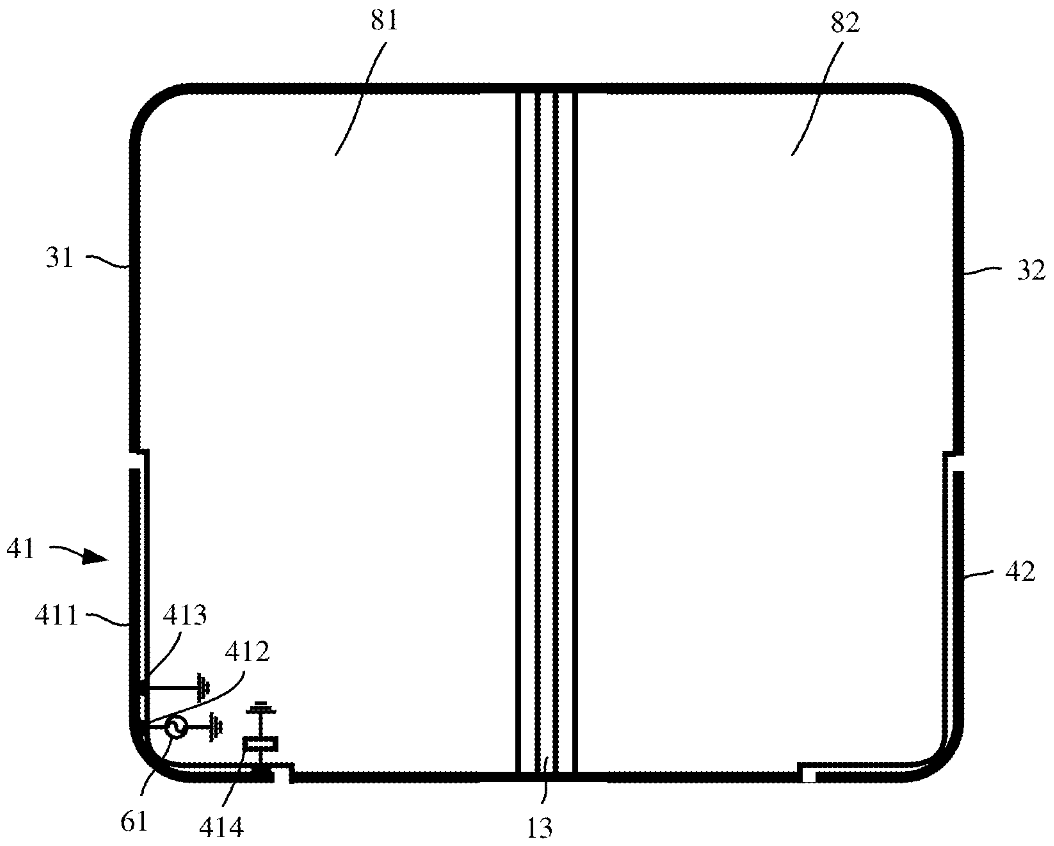
FIG. 4A is a schematic diagram of a structure of another application environment of a low-frequency antenna, where the low-frequency antenna is disposed on a bezel included in the electronic device shown in FIG. 1, and the bezel is in an unfolded state.
Figure 4B:
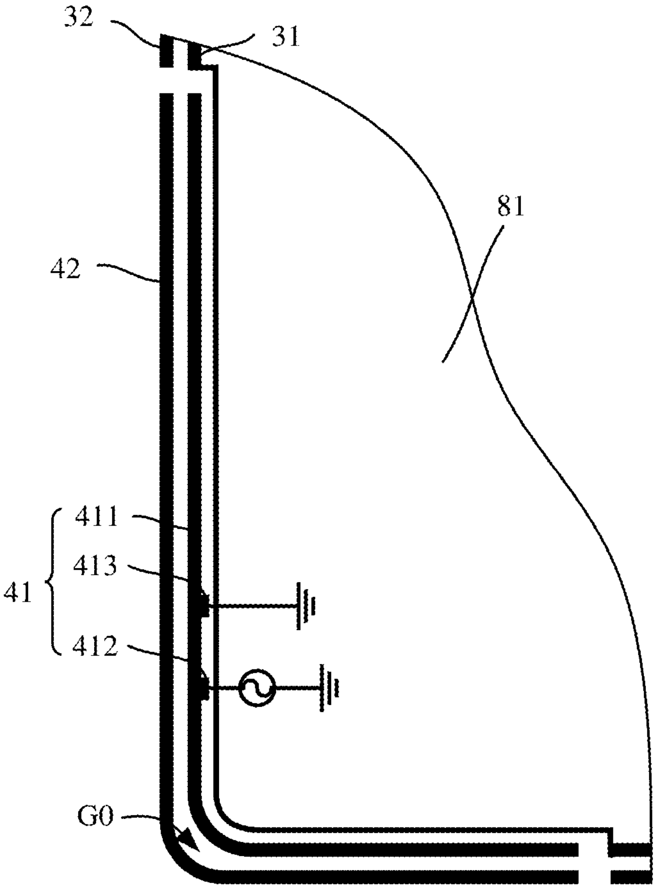
FIG. 4B is an enlarged schematic diagram of a local structure of the bezel shown in FIG. 4A, where the bezel is in a folded state.
Figure 5A:
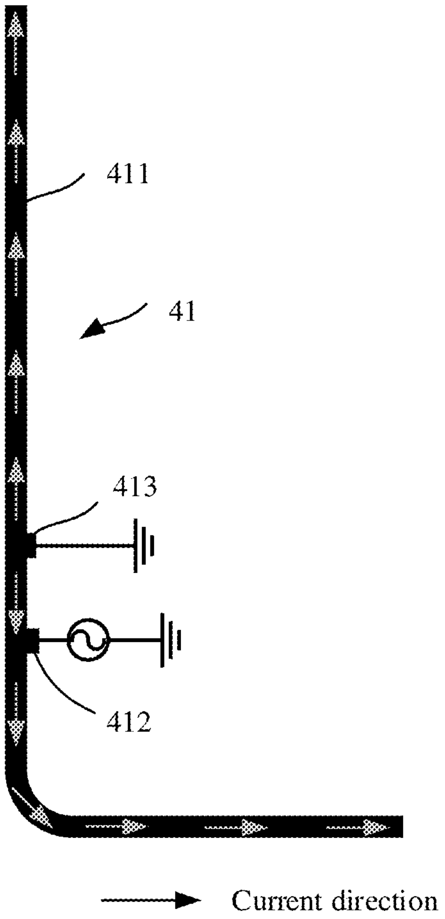
FIG. 5A is a principle diagram of current distribution of the low-frequency antenna shown in FIG. 4A in a case that the electronic device is in an unfolded state and the low-frequency antenna performs feeding.

In another embodiment, as shown in FIG. 4A and FIG. 4B, slotting is further performed on the second metal bezel 32 to form a conductor 42. The conductor 42 overlaps the radiation stub 411 when the electronic device 100 is in the folded state. According to a transmission line theory and an antenna radiation theory, in a relatively small clearance environment, if a spacing between two conductors is relatively small, current distribution on the two conductors and electric field distribution between the two conductors directly affect radiation efficiency of an antenna. As shown in FIG. 5A, because the ground port 413 of the low-frequency antenna 41 is located between the two ends of the radiation stub 411, when the electronic device 100 is in the unfolded state and the low-frequency antenna 41 performs feeding, a current generated on the radiation stub 411 presents a reverse convection pattern on two sides of the ground port 413.

Figure 5B:
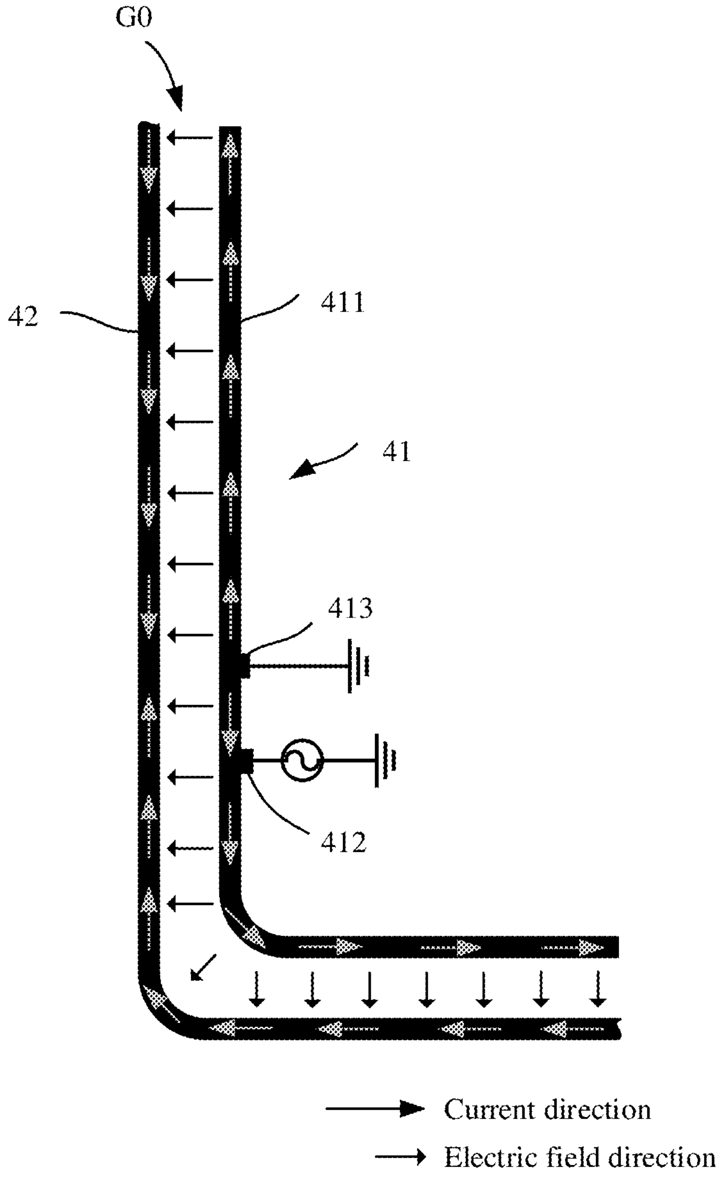
FIG. 5B is a principle diagram of current and electric field distribution of the low-frequency antenna shown in FIG. 4A in a case that the electronic device is in a folded state and the low-frequency antenna performs feeding.

As shown in FIG. 5B, because the conductor 42 is close to the radiation stub 411 and a spacing between the conductor 42 and the radiation stub 411 is relatively small, when the electronic device 100 is in the folded state and the low-frequency antenna 41 performs feeding, electric field coupling is generated between the radiation stub 411 and the conductor 42, so that a current is excited on the conductor 42. In addition, current directions on the radiation stub 411 and the conductor 42 are opposite, and electric fields respectively generated by the radiation stub 411 and the conductor 42 in a gap G0 between the radiation stub 411 and the conductor 42 have a same direction.

Figure 6A:
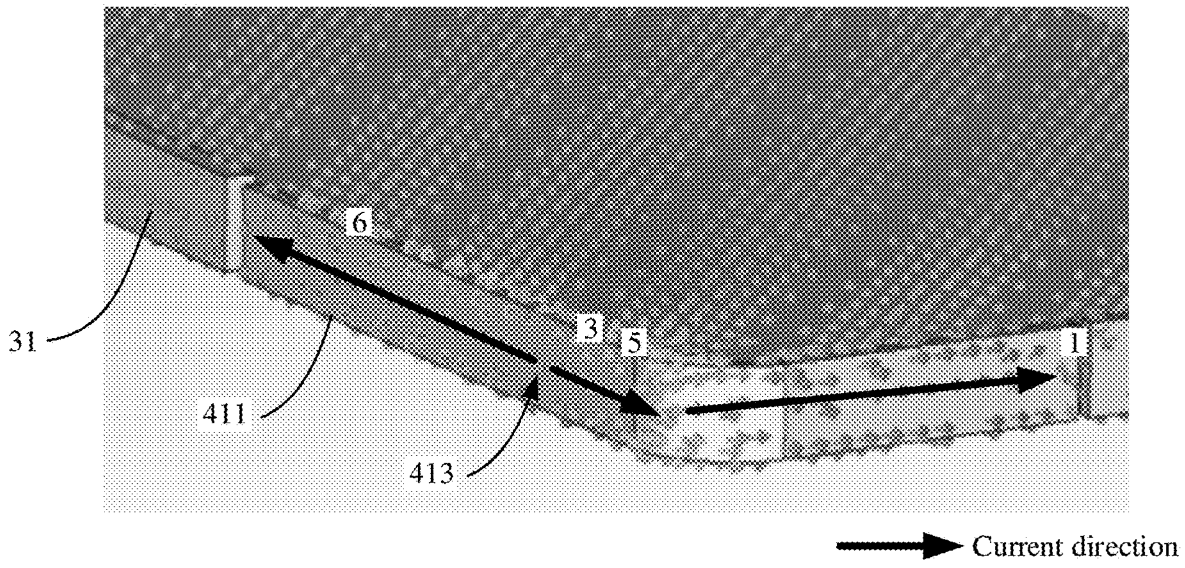
FIG. 6A is a simulation diagram of current distribution of the low-frequency antenna shown in FIG. 4A in a case that the electronic device is in an unfolded state and the low-frequency antenna performs feeding.
Figure 6B:
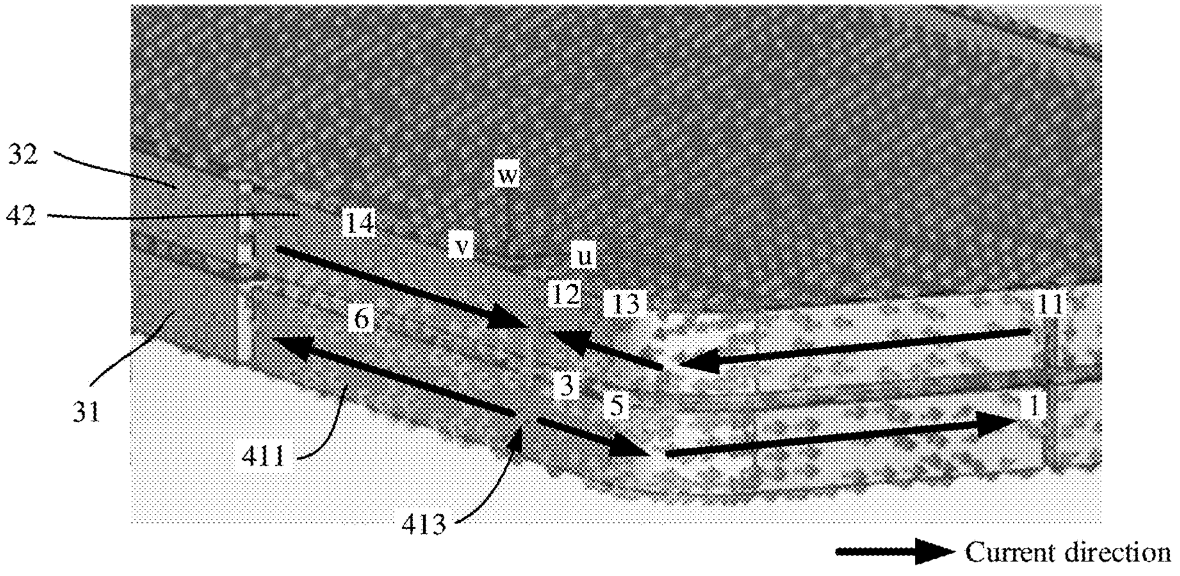
FIG. 6B is a simulation diagram of current distribution of the low-frequency antenna shown in FIG. 4A in a case that the electronic device is in a folded state and the low-frequency antenna performs feeding.

FIG. 6A is a simulation diagram of current distribution of the low-frequency antenna 41 that is obtained by performing a simulation effect test in a case that the electronic device 100 is in the unfolded state and the low-frequency antenna 41 performs feeding. FIG. 6B is a simulation diagram of current distribution of the low-frequency antenna 41 that is obtained by performing a simulation effect test in a case that the electronic device 100 is in the folded state and the low-frequency antenna 41 performs feeding. It can be seen from the simulation diagram shown in FIG. 6A that, in the unfolded state, the current distribution on the radiation stub 411 of the low-frequency antenna 41 presents a convection pattern on two sides of the ground port 413, in other words, current directions on the two sides of the ground port 413 are opposite. It can be seen from the simulation diagram shown in FIG. 6B that, in the folded state, the convection pattern of the current on the radiation stub 411 of the low-frequency antenna 41 is unchanged. In addition, a reversely distributed current is also generated on the conductor 42 that overlaps the radiation stub 411, and the current on the conductor 42 has a direction opposite to that of the current on the radiation stub 411 at relative positions in an overlapping area. With reference to FIG. 5A to FIG. 6B, it can be seen that the current direction shown in the simulation diagram in FIG. 6A corresponds to a current direction shown in a principle diagram in FIG. 5A, and the current direction shown in the simulation diagram in FIG. 6B corresponds to the current direction shown in a principle diagram in FIG. 5B.

Figure 7A:
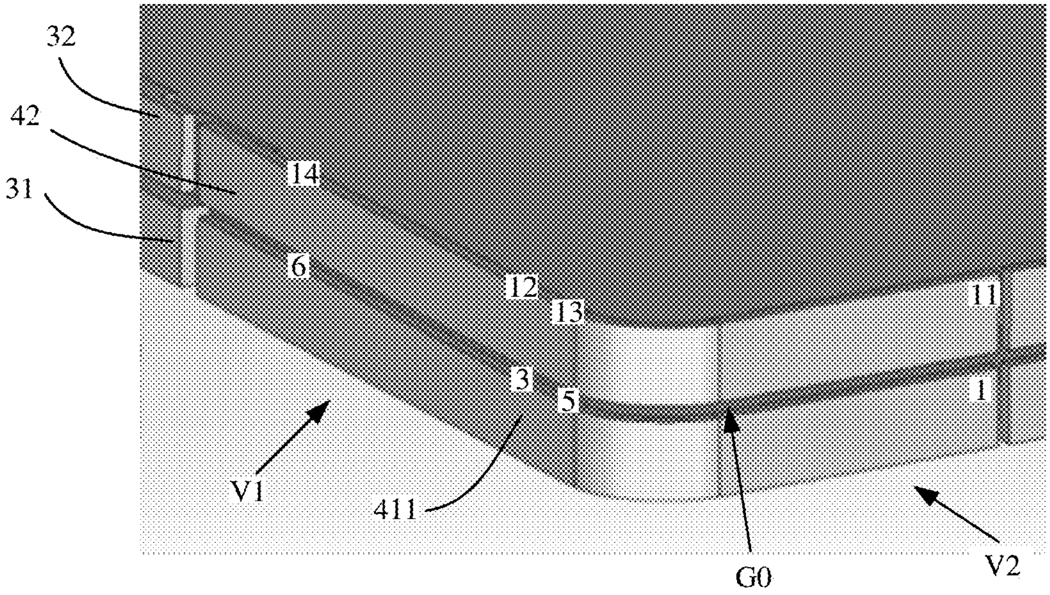
FIG. 7A is a schematic diagram of a partial structure of an electronic device that includes the low-frequency antenna shown in FIG. 4A and that is in a folded state.
Figure 7B:
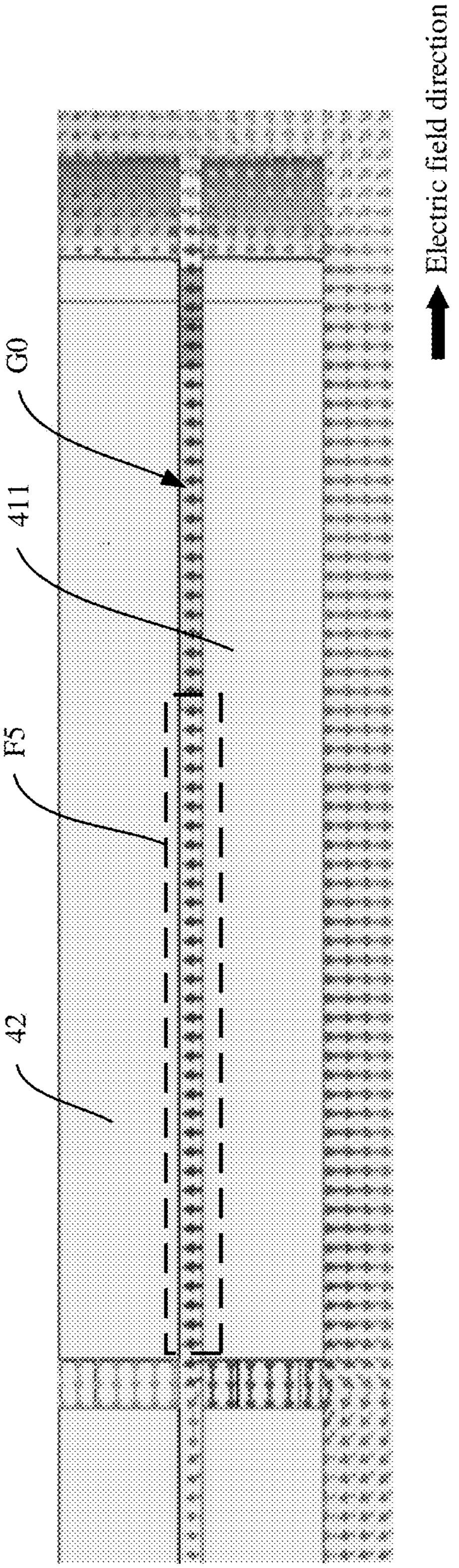
FIG. 7B is a simulation diagram of electric field distribution, presented from a first viewing angle V1 shown in FIG. 7A, of the structure shown in FIG. 7A in a case that the low-frequency antenna performs feeding.
Figure 7C:
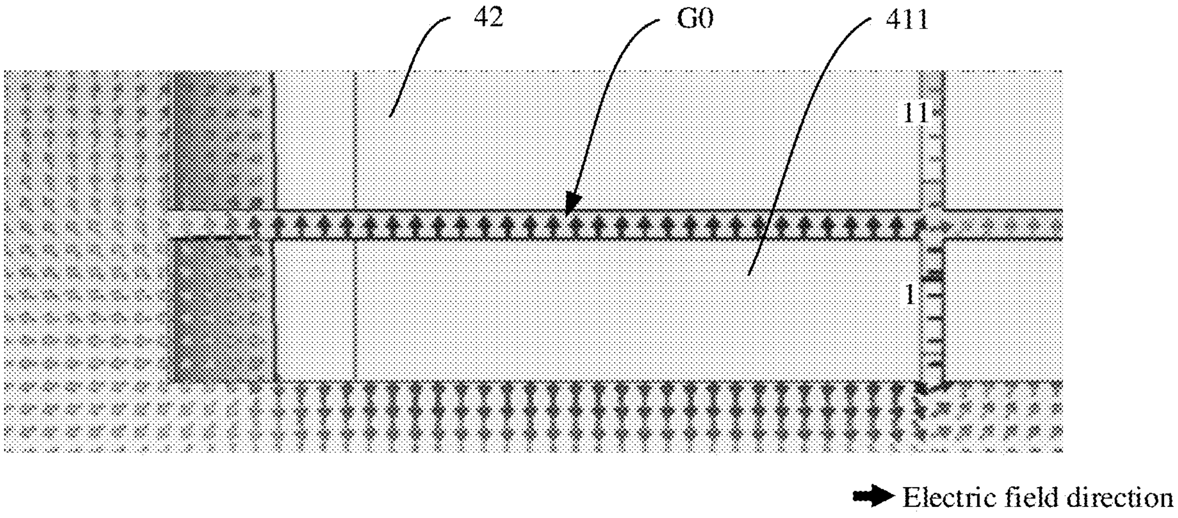
FIG. 7C is a simulation diagram of electric field distribution, presented from a second viewing angle V2 shown in FIG. 7A, of the structure shown in FIG. 7A in a case that the low-frequency antenna performs feeding.

FIG. 7A is a schematic diagram of a partial structure of an electronic device 100 that includes the low-frequency antenna 41 shown in FIG. 4A and that is in a folded state. FIG. 7B is a simulation diagram of electric field distribution, presented from a first viewing angle V1 (a side viewing angle of the electronic device 100), of the structure shown in FIG. 7A that is obtained by performing a simulation effect test in a case that the low-frequency antenna 41 performs feeding. FIG. 7C is a simulation diagram of electric field distribution, presented from a second viewing angle V2 (a bottom viewing angle of the electronic device 100), of the structure shown in FIG. 7A that is obtained by performing a simulation effect test in a case that the low-frequency antenna 41 performs feeding. It can be seen from FIG. 7B and FIG. 7C that, in the folded state, electric fields respectively generated by the radiation stub 411 and the conductor 42 in the gap G0 between the radiation stub 411 and the conductor 42 have a same direction. With reference to FIG. 5B, FIG. 7B, and FIG. 7C, it can be seen that the electric field direction shown in the simulation diagrams in FIG. 7B and FIG. 7C corresponds to the electric field direction shown in the principle diagram in FIG. 5B.

With reference to the principle diagram of the current and electric field distribution shown in FIG. 5B, the simulation diagram of the current distribution shown in FIG. 6B, and the simulation diagrams of the electric field distribution shown in FIG. 7B-FIG. 7C, it can be seen that in the folded state, the current directions on the two overlapping conductors (the radiation stub 411 and the conductor 42) are opposite, and the electric fields respectively generated by the two conductors in the gap G0 between the two conductors have the same direction. This current and electric field distribution characteristic is similar to a current and electric field distribution characteristic on two conductors in a transmission line mode, belongs to a closed field type, and is a mode of energy storage and energy consumption. The current on the radiation stub 411 is canceled out by the current on the conductor 42 from an opposite direction, and energy of the electric fields generated in the gap G0 between the radiation stub 411 and the conductor 42 is stored in a cavity that is jointly constructed by the first body 11, the second body 12, and the connecting structure 13 in the folded state. Consequently, radiation efficiency of the low-frequency antenna 41 decreases, and communication performance of the electronic device 100 is affected.

Figure 8:
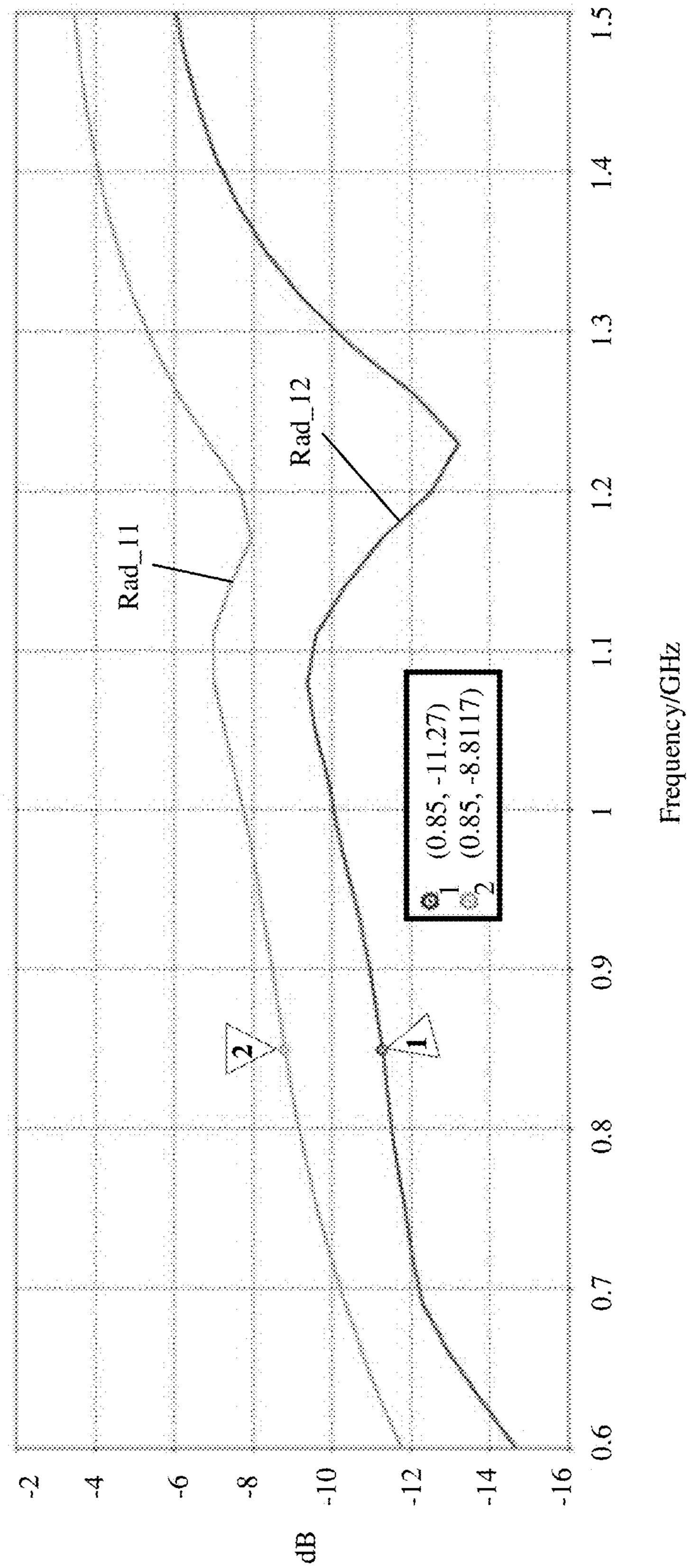
FIG. 8 is a schematic diagram of radiation efficiency curves in cases that the low-frequency antenna shown in FIG. 4A is separately applied to a bar-type electronic device and a foldable electronic device.

FIG. 8 is a schematic diagram of radiation efficiency curves of the low-frequency antenna 41 that are obtained by performing a simulation effect test in cases that the low-frequency antenna 41 is separately applied to a bar-type electronic device and a foldable electronic device. In FIG. 8, a reference sign Rad_11 is used to indicate an antenna radiation efficiency curve existing when the low-frequency antenna 41 is applied to a bar-type electronic device, and a reference sign Rad_12 is used to indicate an antenna radiation efficiency curve existing when the low-frequency antenna 41 is applied to a foldable electronic device (for example, the electronic device 100) and the foldable electronic device is in a folded state.

It can be clearly seen from FIG. 8 that, at a frequency 0.85 GHz in the B5 frequency band, when the low-frequency antenna 41 is applied to a bar-type electronic device, radiation efficiency of the low-frequency antenna 41 is −8.81 dB; and when the low-frequency antenna 41 is applied to a foldable electronic device and the foldable electronic device is in a folded state, radiation efficiency of the low-frequency antenna 41 decreases to −11.27 dB. Compared with the radiation efficiency of the low-frequency antenna on the bar-type electronic device, the radiation efficiency of the low-frequency antenna in the case that the foldable electronic device is in the folded state decreases by about 2.5 dB. It can be learned that, when a same antenna solution is separately applied to a bar-type electronic device and a foldable electronic device, radiation efficiency of the low-frequency antenna 41 is relatively high in a bar-type electronic device application scenario, while radiation efficiency of the low-frequency antenna 41 significantly decreases when the foldable electronic device is in a folded state in a foldable electronic device application scenario.

Figure 9A:
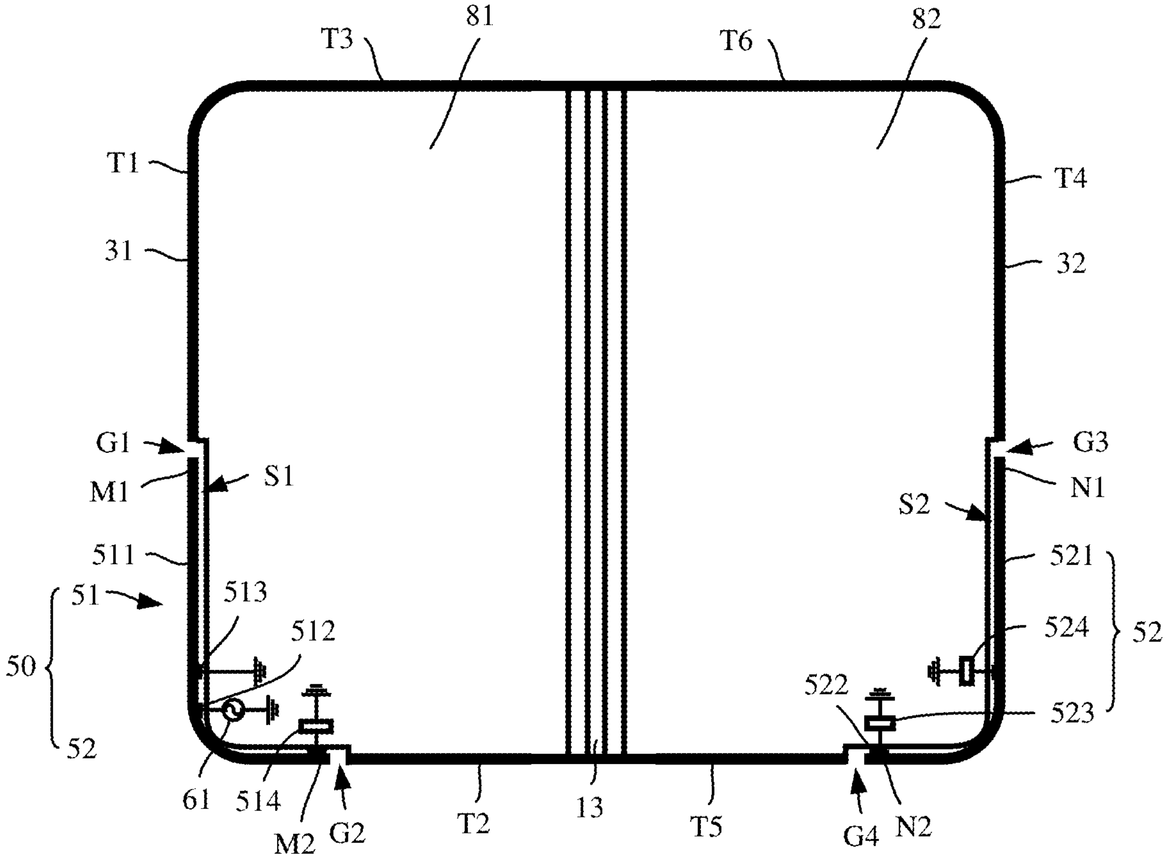
FIG. 9A is a schematic diagram of a structure of an antenna structure according to a first embodiment of this application, where the antenna structure is disposed on a bezel included in the electronic device shown in FIG. 1, the bezel is in an unfolded state, and the antenna structure includes a main antenna unit and a parasitic antenna unit.

To mitigate the problem of significant efficiency decrease of a low-frequency antenna in a case that a foldable electronic device is in a folded state, an embodiment of this application provides an antenna structure, and the antenna structure may be applied to the electronic device 100 shown in FIG. 1-FIG. 2. As shown in FIG. 9A, an antenna structure 50 provided in this embodiment includes a main antenna unit 51 and a parasitic antenna unit 52. The main antenna unit 51 is disposed on one of bodies of the electronic device 100, and the parasitic antenna unit 52 is disposed on the other body of the electronic device 100. In this application, the antenna structure 50 is described by using an example in which the main antenna unit 51 is disposed in the edge area A1 (shown in FIG. 1) of the first body 11, and the parasitic antenna unit 52 is disposed in an edge area A2 (shown in FIG. 1) of the second body 12.

The main antenna unit 51 includes a radiation stub 511, a feeding port 512, a ground port 513, and a first tuning unit 514. The radiation stub 511 includes a first end M1 and a second end M2, and the ground port 513 is disposed between the first end M1 and the second end M2 of the radiation stub 511. A structure and a working principle of the main antenna unit 51 are the same as those of the low-frequency antenna 41 shown in FIG. 3A or FIG. 4A. The radiation stub 511, the feeding port 512, the ground port 513, and the first tuning unit 514 included in the main antenna unit 51 are in a one-to-one correspondence with the radiation stub 411, the feeding port 412, the ground port 413, and the first tuning unit 414 included in the low-frequency antenna 41. For specific details, refer to the foregoing descriptions. Details are not described herein again.

Figure 9B:
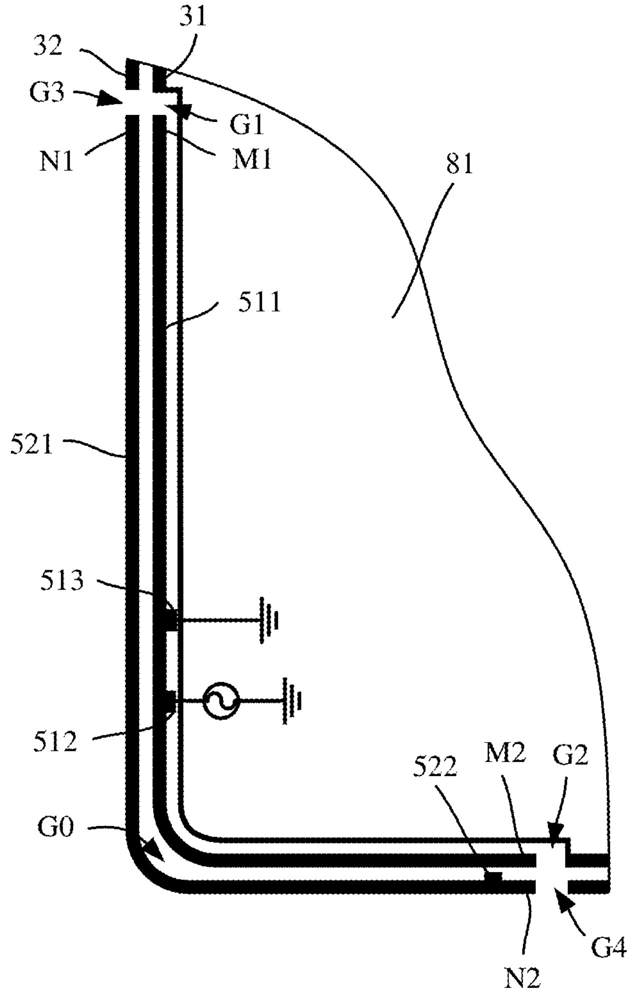
FIG. 9B is an enlarged schematic diagram of a local structure of the bezel shown in FIG. 9A, where the bezel is in a folded state.

In this embodiment, the parasitic antenna unit 52 includes a parasitic stub 521 and a ground return port 522. The parasitic stub 521 includes a first end portion N1 and a second end portion N2. The ground return port 522 is disposed on the parasitic stub 521 and is close to or located at one of the end portions of the parasitic stub 521. When the electronic device 100 is in the unfolded state, as shown in FIG. 9A, the parasitic stub 521 and the radiation stub 511 are disposed opposite to each other on two sides of the electronic device 100. When the electronic device 100 is in the folded state, as shown in FIG. 9B, the parasitic stub 521 and the radiation stub 511 overlap each other. It should be noted that, "overlap" mentioned in this application includes cases of partial overlap and complete overlap, for example, a case in which one or both ends of the radiation stub 511 are not covered by the parasitic stub 521, a case in which one or both ends of the parasitic stub 521 are not covered by the radiation stub 511, and a case in which both ends of the radiation stub 511 are aligned with both ends of the parasitic stub 521.

In this embodiment, as shown in FIG. 9A, the radiation stub 511 is disposed on the first metal bezel 31 of the first body 11, and the parasitic stub 521 is disposed on the second metal bezel 32 of the second body 12. Specifically, a first gap G1 and a second gap G2 are disposed on the first metal bezel 31, and a metal bezel between the first gap G1 and the second gap G2 forms the radiation stub 511 of the main antenna unit 51. In other words, the first gap G1 and the second gap G2 are configured to interrupt an electrical connection between the radiation stub 511 and a remaining structure of the first metal bezel 31. The first end M1 of the radiation stub 511 is adjacent to the first gap G1, and the second end M2 of the radiation stub 511 is adjacent to the second gap G2.

A third gap G3 and a fourth gap G4 are disposed on the second metal bezel 32, and a metal bezel between the third gap G3 and the fourth gap G4 forms the parasitic stub 521 of the parasitic antenna unit 52. In other words, the third gap G3 and the fourth gap G4 are configured to interrupt an electrical connection between the parasitic stub 521 and a remaining structure of the second metal bezel 32. The first end portion N1 of the parasitic stub 521 is adjacent to the third gap G3, and the second end portion N2 of the parasitic stub 521 is adjacent to the fourth gap G4.

When the electronic device 100 is in the folded state, as shown in FIG. 9B, the first gap G1 is disposed opposite to the third gap G3, and the second gap G2 is disposed opposite to the fourth gap G4. In this way, it can be ensured that the parasitic stub 521 can overlap the radiation stub 511 when the electronic device 100 is in the folded state.

The gaps G1-G4 may be filled with a medium, to ensure appearance completeness of the first metal bezel 31 and the second metal bezel 32. The medium may be a non-metal material such as plastic, ceramic, or glass. A specific material of the medium is not specifically limited in this embodiment of this application, and a person skilled in the art may select a corresponding medium material based on an actual requirement. It should be noted that, "disposed opposite to" mentioned in this application includes a case in which positions such as two gaps or two end portions are directly opposite to each other, and also includes a case in which positions such as two gaps or two end portions deviate from each other by a small distance. As shown in FIG. 9A, the first floor 81 (for example, a middle frame) on the first body 11 may further be provided with a slot S1 at a position adjacent to the radiation stub 511, to implement isolation between the radiation stub 511 and the first floor 81. Similarly, the second floor 82 (for example, a middle frame) on the second body 12 may further be provided with a slot S2 at a position adjacent to the parasitic stub 521, to implement isolation between the parasitic stub 521 and the second floor 82.

In this embodiment, the first metal bezel 31 includes a first connecting segment T1, a second connecting segment T2, and a third connecting segment T3, and the first connecting segment T1 is disposed opposite to the connecting structure 13. The second connecting segment T2 and the third connecting segment T3 each are connected to the first connecting segment T1, and each are located between the first connecting segment T1 and the connecting structure 13. The second metal bezel 32 includes a fourth connecting segment T4, a fifth connecting segment T5, and a sixth connecting segment T6, and the fourth connecting segment T4 is disposed opposite to the connecting structure 13. The fifth connecting segment T5 and the sixth connecting segment T6 each are connected to the fourth connecting segment T4, and each are located between the fourth connecting segment T4 and the connecting structure 13. The first connecting segment T1 and the fourth connecting segment T4 each may be a side bezel of the electronic device 100, the second connecting segment T2 and the fifth connecting segment T5 each may be a bottom bezel of the electronic device 100, and the third connecting segment T3 and the sixth connecting segment T6 each may be a top bezel of the electronic device 100.

In a first implementation, as shown in FIG. 9A, the first gap G1 is disposed on the first connecting segment T1 of the first metal bezel 31, and the second gap G2 is disposed on the second connecting segment T2 of the first metal bezel 31, so that the radiation stub 511 is like an L-shaped strip. Correspondingly, the third gap G3 is disposed on the fourth connecting segment T4 of the second metal bezel 32, and the fourth gap G4 is disposed on the fifth connecting segment T5 of the second metal bezel 32, so that the parasitic stub 521 is also like an L-shaped strip. In other words, the radiation stub 511 and the parasitic stub 521 are respectively disposed in bottom corner positions on both sides of the electronic device 100.

Figure 10:
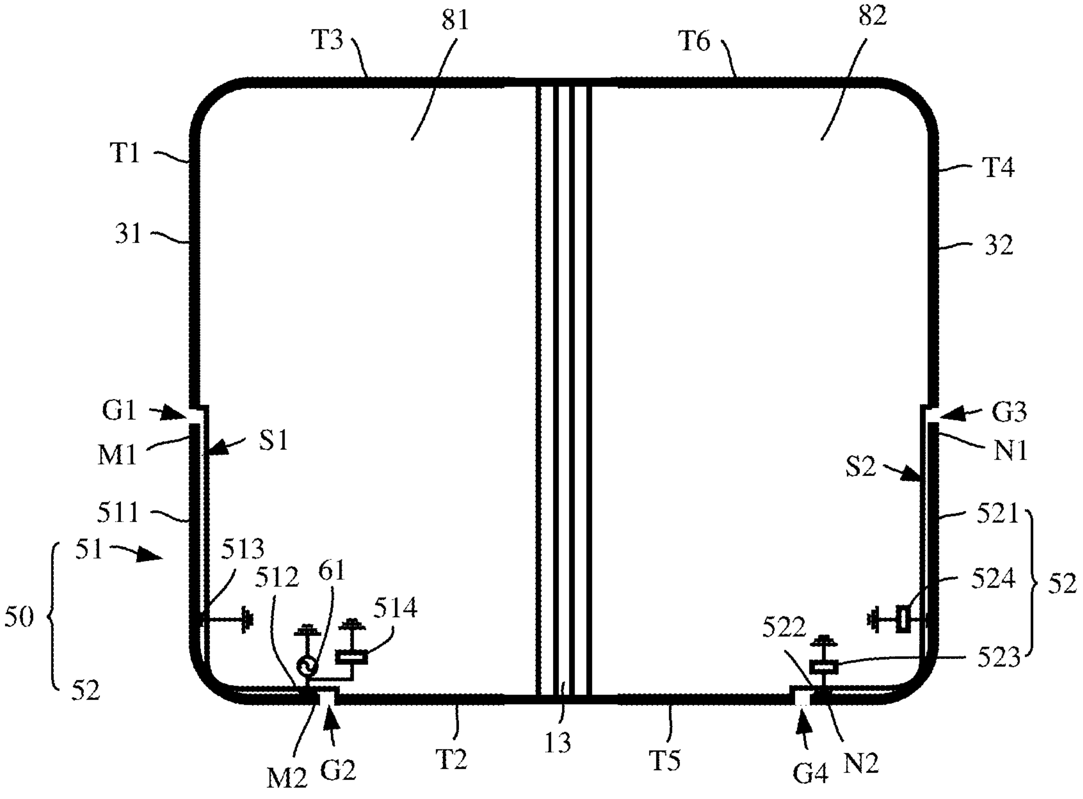
FIG. 10 is a schematic diagram of a structure of an antenna structure according to a second embodiment of this application, where the antenna structure is disposed on a bezel included in the electronic device shown in FIG. 1, and the bezel is in an unfolded state.

In the first implementation, the feeding port 512 may be disposed on the first connecting segment T1 of the first metal bezel 31, to form a side feed to excite the main antenna unit 51. Optionally, as shown in FIG. 10, the feeding port 512 may alternatively be disposed on the second connecting segment T2 of the first metal bezel 31, to form a bottom feed to excite the main antenna unit 51.

Optionally, in a second implementation, the first gap G1 may be disposed on the first connecting segment T1 of the first metal bezel 31, and the second gap G2 may be disposed on the third connecting segment T3 of the first metal bezel 31, so that the radiation stub 511 is like an L-shaped strip. Correspondingly, the third gap G3 may be disposed on the fourth connecting segment T4 of the second metal bezel 32, and the fourth gap G4 may be disposed on the sixth connecting segment T6 of the second metal bezel 32, so that the parasitic stub 521 is like an L-shaped strip. In other words, the radiation stub 511 and the parasitic stub 521 are respectively disposed in top corner positions on both sides of the electronic device 100.

In the second implementation, the feeding port 512 may be disposed on the first connecting segment T1 of the first metal bezel 31 to form a side feed, or may be disposed on the third connecting segment T3 of the first metal bezel 31 to form a top feed.

Optionally, in a third implementation, the radiation stub 511 and the parasitic stub 521 each are like a linear strip. Correspondingly, the first gap G1 and the second gap G2 each are disposed on the first connecting segment T1 of the first metal bezel 31, and the third gap G3 and the fourth gap G4 each are disposed on the fourth connecting segment T4 of the second metal bezel 32. Alternatively, the first gap G1 and the second gap G2 each are disposed on the second connecting segment T2 of the first metal bezel 31, and the third gap G3 and the fourth gap G4 each are disposed on the fifth connecting segment T5 of the second metal bezel 32. Alternatively, the first gap G1 and the second gap G2 each are disposed on the third connecting segment T3 of the first metal bezel 31, and the third gap G3 and the fourth gap G4 each are disposed on the sixth connecting segment T6 of the second metal bezel 32.

It should be noted that, shapes of the radiation stub 511 and the parasitic stub 521 and specific disposing positions of the radiation stub 511 and the parasitic stub 521 on the bezel 30 may be adjusted and deformed accordingly based on actual requirements.

Figure 11:
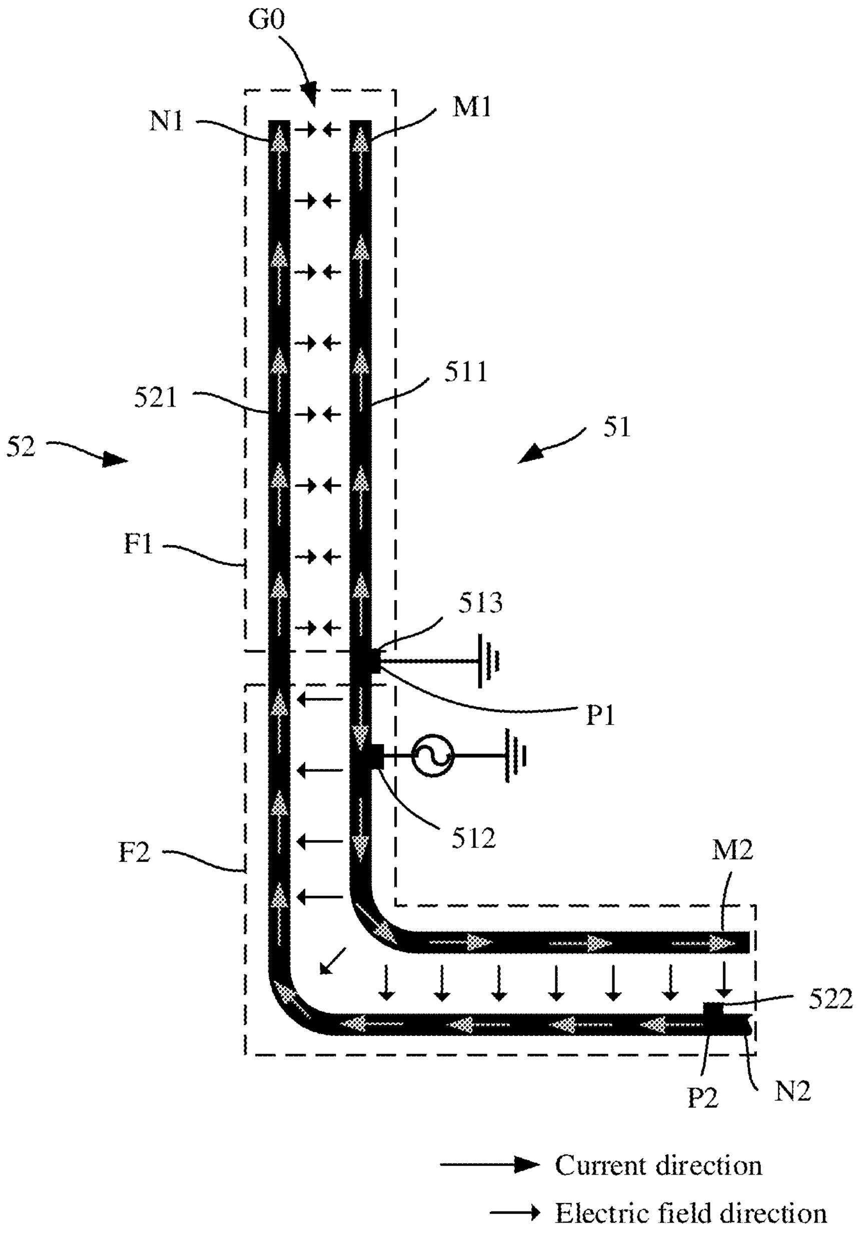
FIG. 11 is a principle diagram of current and electric field distribution of the antenna structure shown in FIG. 9A in a case that the electronic device is in a folded state and the main antenna unit performs feeding.

When the electronic device 100 is in the folded state and the main antenna unit 51 performs feeding, as shown in FIG. 11, the main antenna unit 51 is coupled to the parasitic antenna unit 52 by using the gap G0 between the radiation stub 511 and the parasitic stub 521, so that a current generated on the parasitic stub 521 is in a same direction as a current generated in at least some areas of the radiation stub 511. For example, in an overlapping area in a dashed-line box F1 shown in FIG. 11, the current generated on the parasitic stub 521 is in the same direction as the current generated on the radiation stub 511.

In the electronic device 100 provided in this application, for the main antenna unit 51 (a low-frequency antenna) deployed on one body (for example, the first body 11) of the electronic device 100, the parasitic antenna unit 52 overlapping the main antenna unit 51 in the folded state is constructed on the other body (for example, the second body 12) of the electronic device 100, and the current generated on the parasitic stub 521 of the parasitic antenna unit 52 is made to have the same direction as the current generated in at least some areas of the radiation stub 511 of the main antenna unit 51, to reduce a radiation energy loss of the radiation stub 511 by using the currents superimposed in the same direction, and further improve radiation efficiency of the main antenna unit 51 in the folded state and improve communication performance of the electronic device 100.

Specifically, referring to FIG. 9A again, in this embodiment, the parasitic antenna unit 52 further includes a ground return structure 523 electrically connected to the ground return port 522 of the parasitic stub 521, the ground return port 522 of the parasitic stub 521 is grounded by using the ground return structure 523, and the ground return structure 523 is configured to construct a low-impedance boundary on the parasitic stub 521.

In an implementation, the ground return structure 523 is a low-impedance circuit including several passive devices. The passive device includes a device such as a zero-ohm resistor R1, a large capacitor C1, or a small inductor L1, so that a low-impedance boundary can be constructed on the parasitic stub 521 to form a ground return point.

Optionally, in another implementation, the ground return structure 523 may include a plurality of low-impedance circuits disposed in parallel and switch devices electrically connected to the plurality of low-impedance circuits, where each low-impedance circuit may include several passive devices, and the switch devices may be single-pole multi-throw switches or may include a plurality of switch units. The switch devices are configured to control connected/disconnected states of the plurality of low-impedance circuits. By controlling the connected/disconnected states of the plurality of low-impedance circuits by using the switch devices, low-impedance boundaries with different impedance values may be constructed on the parasitic stub 521 to the ground return point.

Figure 12:
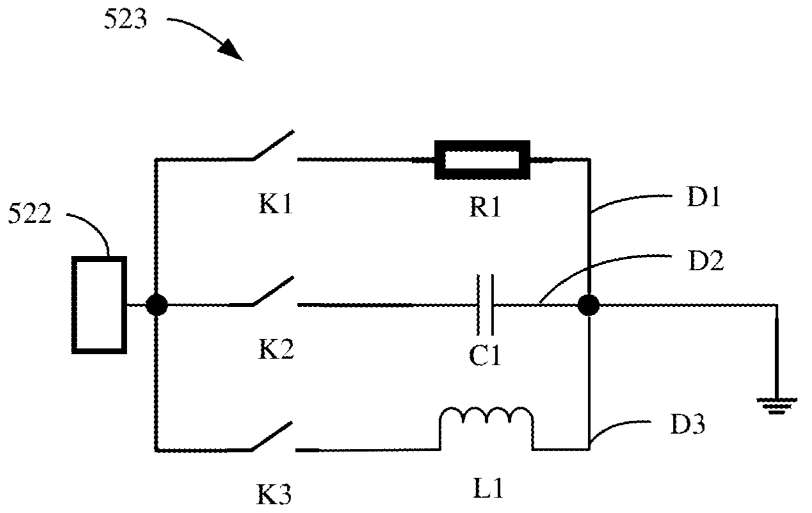
FIG. 12 is a schematic diagram of a circuit structure of a ground return structure included in the parasitic antenna unit shown in FIG. 9A.

For example, as shown in FIG. 12, the ground return structure 523 includes a first low-impedance circuit D1, a second low-impedance circuit D2, and a third low-impedance circuit D3 that are disposed in parallel. One end of each of the first low-impedance circuit D1, the second low-impedance circuit D2, and the third low-impedance circuit D3 is electrically connected to the ground return port 522, and the other end of each of the first low-impedance circuit D1, the second low-impedance circuit D2, and the third low-impedance circuit D3 is grounded. The switch devices include a first switch unit K1, a second switch unit K2, and a third switch unit K3. The first low-impedance circuit D1 includes a zero-ohm resistor R1, and the first switch unit K1 is connected in series in the first low-impedance circuit D1, to control connection/disconnection of the first low-impedance circuit D1. The second low-impedance circuit D2 includes a capacitor C1, and the second switch unit K2 is connected in series in the second low-impedance circuit D2, to control connection/disconnection of the second low-impedance circuit D2. The third low-impedance circuit D3 includes an inductor L1, and the third switch unit K3 is connected in series in the third low-impedance circuit D3, to control connection/disconnection of the third low-impedance circuit D3. By conducting any of the first low-impedance circuit D1, the second low-impedance circuit D2, and the third low-impedance circuit D3, a low-impedance boundary can be constructed on the parasitic stub 521 to form the ground return point.

In this embodiment, a resonance frequency of the parasitic antenna unit 52 is less than a resonance frequency of the main antenna unit 51, so that the parasitic antenna unit 52 is used to improve radiation efficiency of the main antenna unit 51 in the folded state. Referring to FIG. 9A again, the first tuning unit 514 is configured to adjust the resonance frequency of the main antenna unit 51, so that the main antenna unit 51 operates on a preset target frequency band. In this embodiment, an operating frequency band of the main antenna unit 51 is a low frequency band, that is, the target frequency band is a low frequency band. It may be understood that, the resonance frequency of the main antenna unit 51 is adjusted by using the first tuning unit 514, so that the main antenna unit 51 can cover different target frequency bands at different moments, for example, a B28 frequency band, a B5 frequency band, or a B8 frequency band in a low frequency band, to meet an actual design requirement.

One end of the first tuning unit 514 is electrically connected to the radiation stub 511, and the other end is grounded. In an implementation, the first tuning unit 514 is a matching circuit including several passive devices. The passive device includes a device such as a zero-ohm resistor, a capacitor, or an inductor. Optionally, in another implementation, the first tuning unit 514 may include a plurality of matching branches disposed in parallel and switch devices electrically connected to the plurality of matching branches, where each matching branch may include several passive devices, and the switch devices may be single-pole multi-throw switches or may include a plurality of switch units. The switch devices are configured to control connected/disconnected states of the plurality of matching branches. Impedance of the first tuning unit 514 may be adjusted by controlling the connected/disconnected states of the plurality of matching branches by using the switch devices, to adjust an electrical length of the radiation stub 511, so that the main antenna unit 51 can cover different target frequency bands at different moments. A structure of the first tuning unit 514 is not specifically limited in this application, and may be specifically determined based on an actual design requirement.

The parasitic antenna unit 52 further includes a second tuning unit 524 electrically connected to the parasitic stub 521, and the second tuning unit 524 is configured to adjust the resonance frequency of the parasitic antenna unit 52, so that the resonance frequency of the parasitic antenna unit 52 is close to and less than a main resonance frequency of the main antenna unit 51. It may be understood that, the resonance frequency of the parasitic antenna unit 52 is adjusted by using the second tuning unit 524, so that the resonance frequency of the parasitic antenna unit 52 can be correspondingly adjusted as the resonance frequency of the main antenna unit 51 changes, to meet an actual design requirement. For example, a proper frequency spacing is maintained between the resonance frequency of the parasitic antenna unit 52 and the resonance frequency of the main antenna unit 51, to improve radiation efficiency of the main antenna unit 51 in the folded state.

One end of the second tuning unit 524 is electrically connected to the parasitic stub 521, and the other end is grounded. A connection joint between the second tuning unit 524 and the parasitic stub 521 is remote from the ground return port 522 of the parasitic stub 521. In an implementation, the second tuning unit 524 is a matching circuit composed of several passive devices. The passive device includes a device such as a zero-ohm resistor, a capacitor, or an inductor. Optionally, in another implementation, the second tuning unit 524 may include a plurality of matching branches disposed in parallel and switch devices electrically connected to the plurality of matching branches, where each matching branch may include several passive devices, and the switch devices may be single-pole multi-throw switches or may include a plurality of switch units. The switch devices are configured to control connected/disconnected states of the plurality of matching branches. Impedance of the second tuning unit 524 may be adjusted by controlling the connected/disconnected states of the plurality of matching branches by using the switch devices, to adjust an electrical length of the parasitic stub 521, so that the resonance frequency of the parasitic antenna unit 52 is close to and less than a main resonance frequency of the main antenna unit 51.

In this embodiment, the radiation stub 511 and the parasitic stub 521 are approximately symmetrically disposed on the two bodies of the electronic device 100. The first end M1 and the second end M2 of the radiation stub 511 of the main antenna unit 51 are open-circuit ends/suspended ends. As shown in FIG. 9B, when the electronic device 100 is in the folded state, the first end portion N1 of the parasitic stub 521 is disposed opposite to the first end M1 of the radiation stub 511, and the second end portion N2 of the parasitic stub 521 is disposed opposite to the second end M2 of the radiation stub 511.

As shown in FIG. 11, the ground port 513 of the main antenna unit 51 is located at a position P1 on the radiation stub 511, and the radiation stub 511 includes a first radiation area P1-M1 located between the ground port 513 and the first end M1 of the radiation stub 511 and a second radiation area P1-M2 located between the ground port 513 and the second end M2 of the radiation stub 511.

In a first implementation, the ground return port 522 of the parasitic antenna unit 52 is located at a position P2 on the parasitic stub 521. The ground return port 522 of the parasitic antenna unit 52 is close to or located at the second end portion N2 of the parasitic stub 521, and the parasitic stub 521 includes a main radiation area P2-N1 located between the ground return port 522 and the first end portion N1 of the parasitic stub 521. When the electronic device 100 is in the folded state and the main antenna unit 51 performs feeding, the main antenna unit 51 is coupled to the parasitic antenna unit 52, so that a current generated in the main radiation area P2-N1 of the parasitic stub 521 is in a same direction as a current generated in the first radiation area P1-M1 of the radiation stub 511.

In an implementation, a main resonant mode of the main antenna unit 51 is a ½ wavelength common-mode resonant mode, and a resonant mode of the parasitic antenna unit 52 is a ¼ wavelength resonant mode. Because the ground port 513 of the main antenna unit 51 is located between the first end M1 and the second end M2 of the radiation stub 511, when the main antenna unit 51 operates in the main resonant mode, the current generated on the radiation stub 511 presents a reverse convection pattern on two sides of the ground port 513.

When the electronic device 100 is in the folded state, because the parasitic stub 521 is close to the radiation stub 511 and a spacing between the parasitic stub 521 and the radiation stub 511 is relatively small, and in addition, the ground return port 522 of the parasitic stub 521 is also close to the second end M2 of the radiation stub 511, the second end M2 of the radiation stub 511 is in a high impedance state and has a relatively strong electric field, and a position of the ground return port 522 of the parasitic stub 521 is in a small impedance state, an electric field and a current that are generated on the radiation stub 511 may be coupled to the parasitic stub 521 through the second end M2 of the radiation stub 511, the gap G0 between the radiation stub 511 and the parasitic stub 521, and the ground return port 522 of the parasitic stub 521. In this way, the ¼ wavelength resonant mode is excited in the main radiation area P2-N1 of the parasitic stub 521, so that a current in a same direction is generated in the main radiation area P2-N1, and the current generated in the main radiation area P2-N1 is in a same direction as a current generated in the first radiation area P1-M1 of the radiation stub 511. In this way, in the area shown in the dashed-line box F1 shown in FIG. 11, the current in the main radiation area P2-N1 of the parasitic stub 521 is in the same direction as the current generated in the first radiation area P1-M1 of the radiation stub 511, and electric fields generated by the main radiation area P2-N1 and the first radiation area P1-M1 in the gap G0 between the main radiation area P2-N1 and the first radiation area P1-M1 have opposite directions. In an area shown in a dashed-line box F2 shown in FIG. 11, the current in the main radiation area P2-N1 of the parasitic stub 521 is in a direction opposite to that of a current in the second radiation area P1-M2 of the radiation stub 511, and electric fields generated by the main radiation area P2-N1 and the second radiation area P1-M2 in the gap G0 between the main radiation area P2-N1 and the second radiation area P1-M2 have a same direction.

Figure 13:
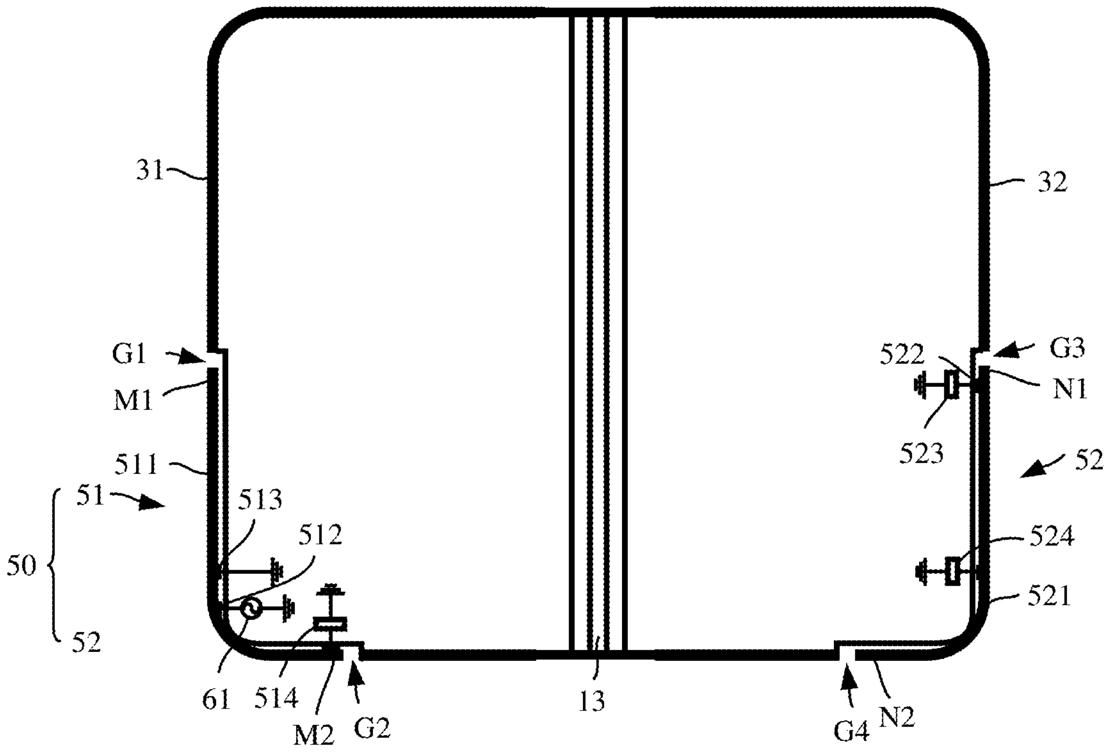
FIG. 13 is a schematic diagram of a structure of an antenna structure according to a third embodiment of this application, where the antenna structure is disposed on a bezel included in the electronic device shown in FIG. 1, and the bezel is in an unfolded state.
Figure 14:
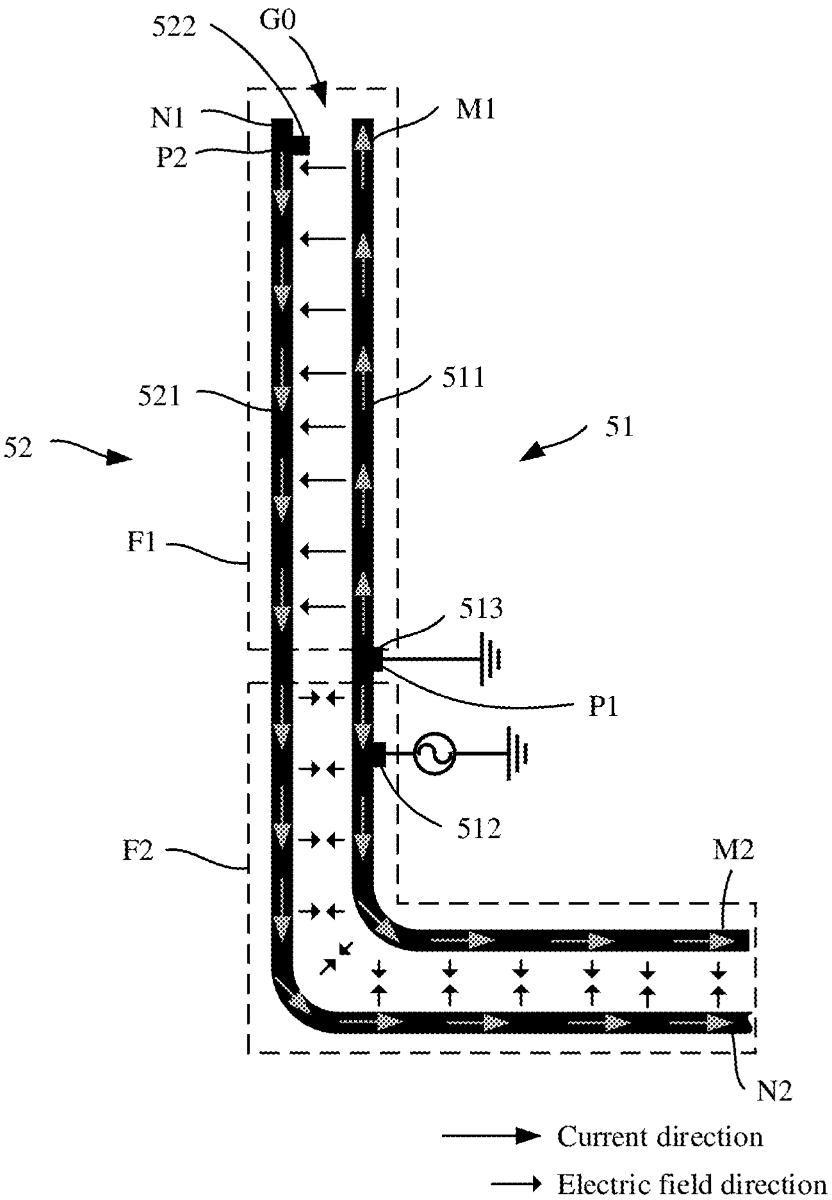
FIG. 14 is a principle diagram of current and electric field distribution of the antenna structure shown in FIG. 13 in a case that the electronic device is in a folded state and a main antenna unit performs feeding.

Optionally, in a second implementation, as shown in FIG. 13 and FIG. 14, the ground return port 522 of the parasitic antenna unit 52 is close to or located at the first end portion N1 of the parasitic stub 521, and the parasitic stub 521 includes a main radiation area P2-N2 located between the ground return port 522 and the second end portion N2 of the parasitic stub 521. When the electronic device 100 is in the folded state and the main antenna unit 51 performs feeding, the main antenna unit 51 is coupled to the parasitic antenna unit 52, so that a current generated in the main radiation area P2-N2 of the parasitic stub 521 is in a same direction as a current generated in the second radiation area P1-M2 of the radiation stub 511.

Figure 15A:
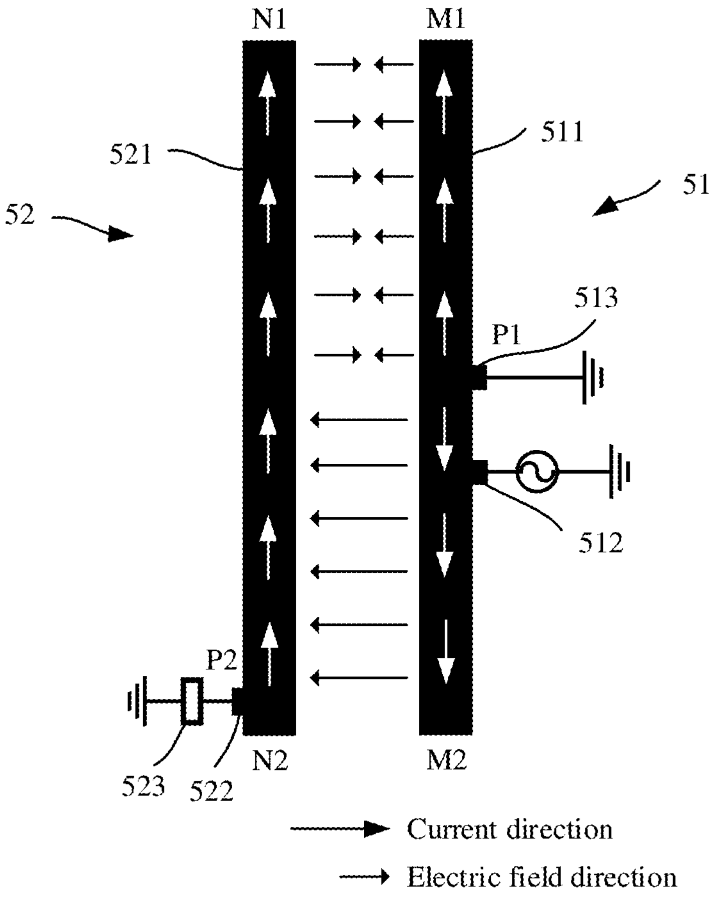
FIG. 15A is a principle diagram of current and electric field distribution of an antenna structure according to a fourth embodiment of this application in a case that an electronic device is in a folded state and a main antenna unit performs feeding.
Figure 15B:
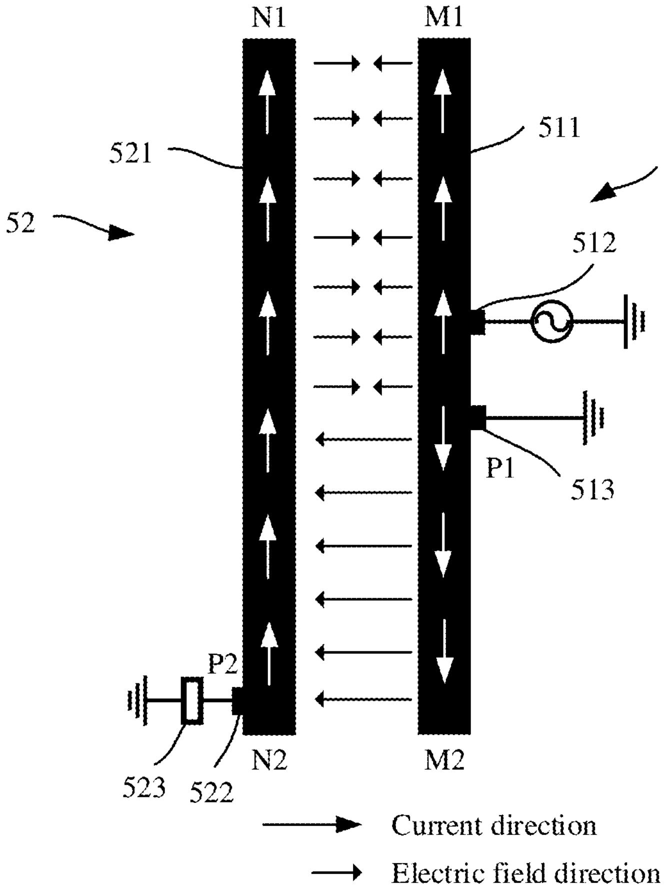
FIG. 15B is a principle diagram of current and electric field distribution of an antenna structure according to a fifth embodiment of this application in a case that an electronic device is in a folded state and a main antenna unit performs feeding.
Figure 15C:
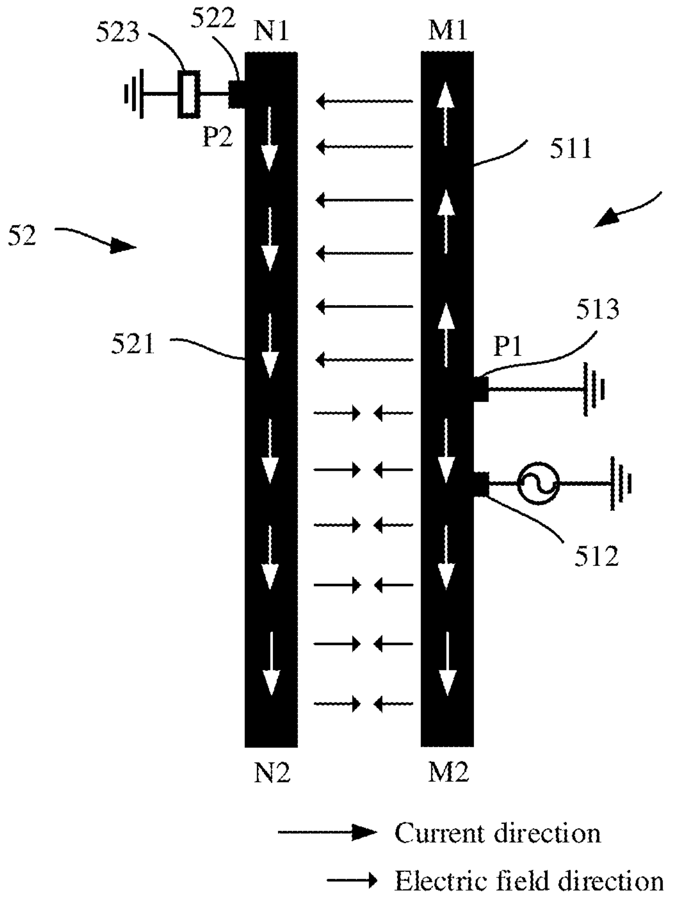
FIG. 15C is a principle diagram of current and electric field distribution of an antenna structure according to a sixth embodiment of this application in a case that an electronic device is in a folded state and a main antenna unit performs feeding.
Figure 15D:
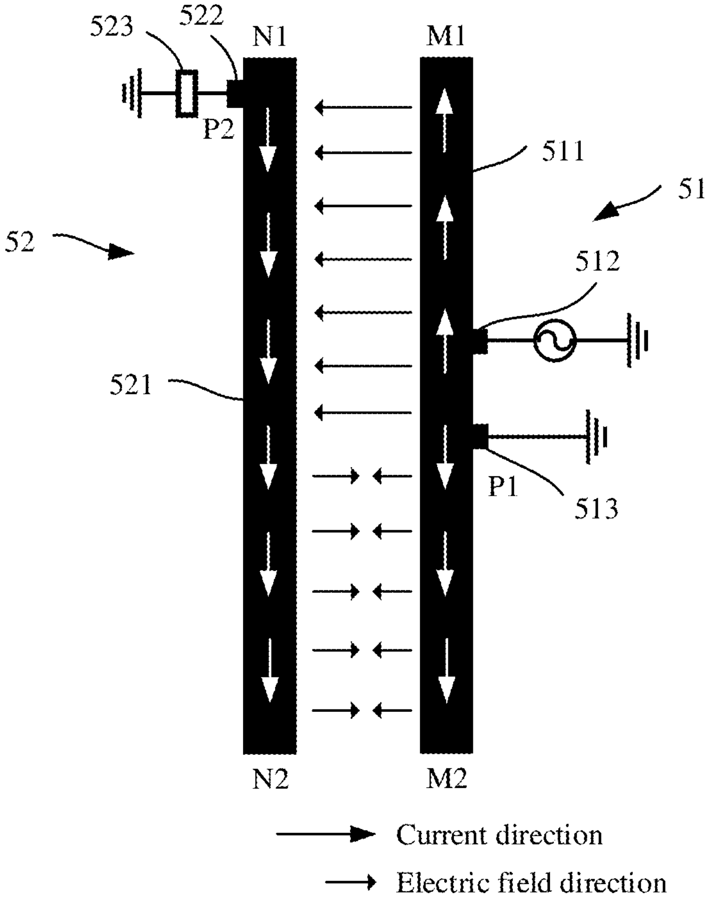
FIG. 15D is a principle diagram of current and electric field distribution of an antenna structure according to a seventh embodiment of this application in a case that an electronic device is in a folded state and a main antenna unit performs feeding.

As described above, the shapes of the radiation stub 511 and the parasitic stub 521 may be adjusted and deformed accordingly based on actual requirements. In addition, in another implementation, relative positions of the feeding port 512 and the ground port 513 of the main antenna unit 51 on the radiation stub 511 may also be adjusted accordingly based on an actual design requirement. For example, as shown in FIG. 15A-FIG. 15D, shapes of the radiation stub 511 and the parasitic stub 521 each may be like a linear strip. As shown in FIG. 15A-FIG. 15C, the feeding port 512 may be closer to the second end M2 of the radiation stub 511, while the ground port 513 is closer to the first end M1 of the radiation stub 511. Alternatively, as shown in FIG. 15B and FIG. 15D, the feeding port 512 may be closer to the first end M1 of the radiation stub 511, and the ground port 513 is closer to the second end M2 of the radiation stub 511. It should be noted that, an operating principle of the antenna structure shown in FIG. 15A-FIG. 15D is similar to an operating principle of the antenna structure 50 shown in FIG. 9A-FIG. 11 or FIG. 13-FIG. 14. The operating principle of the antenna structure shown in FIG. 15A-FIG. 15D is not described herein again.

The following analyzes performance of the antenna structure 50 shown in FIG. 9A by using an example in which the main antenna unit 51 operates on the B5 frequency band and the main resonance frequency is 0.85 GHz.

Figure 16:
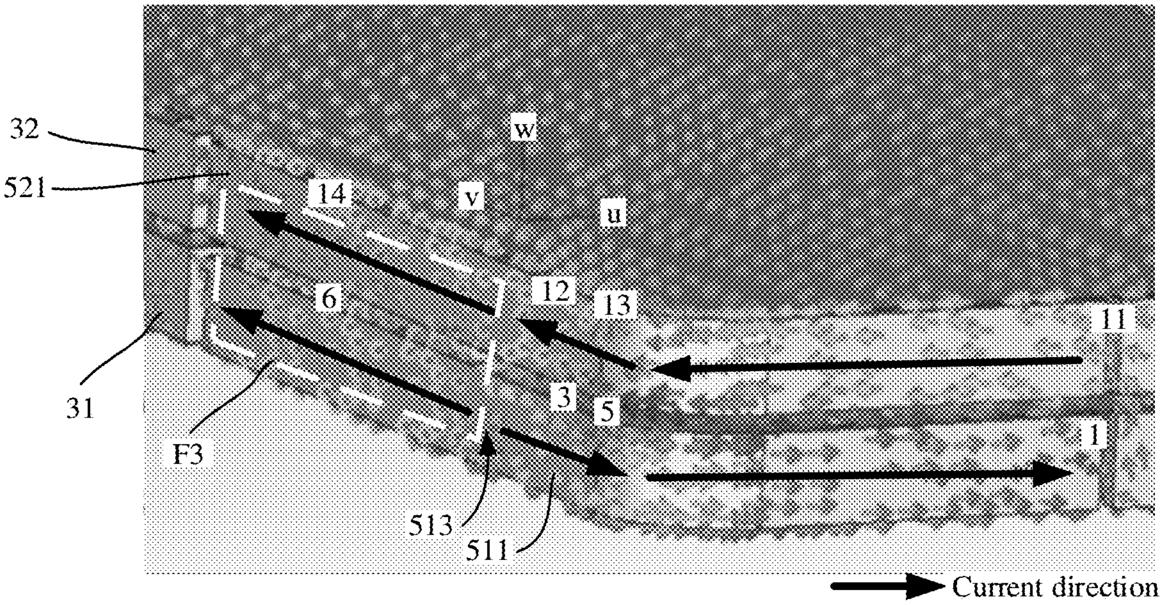
FIG. 16 is a simulation diagram of current distribution of the antenna structure shown in FIG. 9A in a case that the electronic device is in a folded state and the main antenna unit performs feeding.

FIG. 16 is a simulation diagram of current distribution of the antenna structure 50 that is obtained by performing a simulation effect test in a case that the electronic device 100 is in a folded state and the main antenna unit 51 performs feeding. It can be seen from the simulation diagram shown in FIG. 16 that, in the folded state, the current distribution on the radiation stub 511 of the main antenna unit 51 presents a convection pattern on the two sides of the ground port 513. Currents in a same direction are generated on the parasitic stub 521, and as shown in a white dashed-line box F3 in FIG. 16, a current direction on the parasitic stub 521 is the same as a current direction on the radiation stub 511.

Figure 17A:
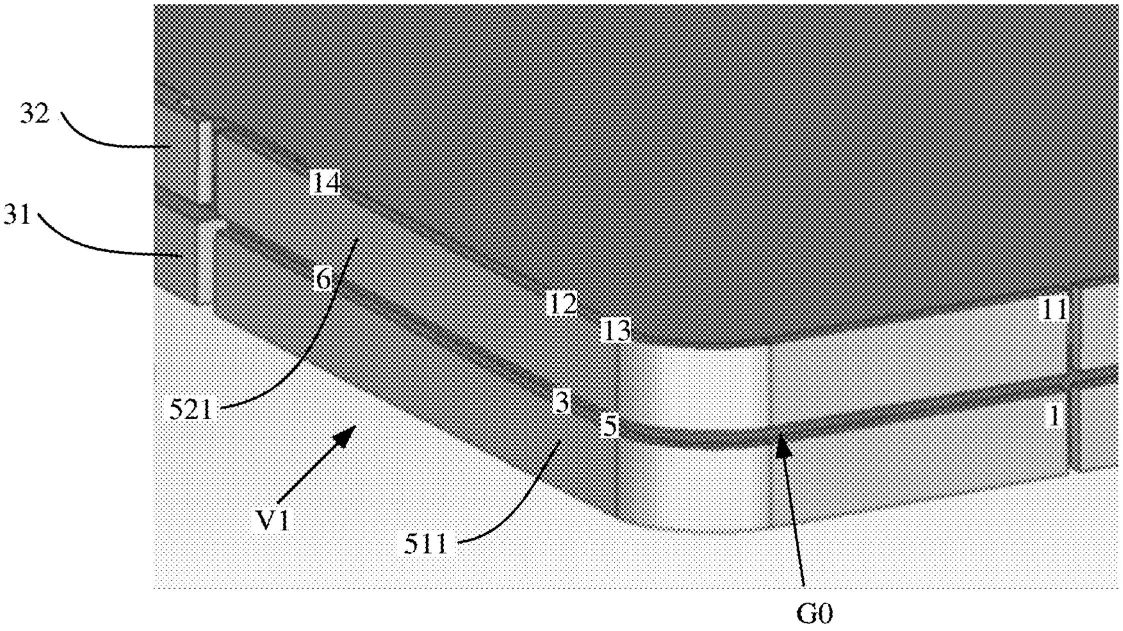
FIG. 17A is a schematic diagram of a partial structure of an electronic device that includes the antenna structure shown in FIG. 9A and that is in a folded state.
Figure 17B:
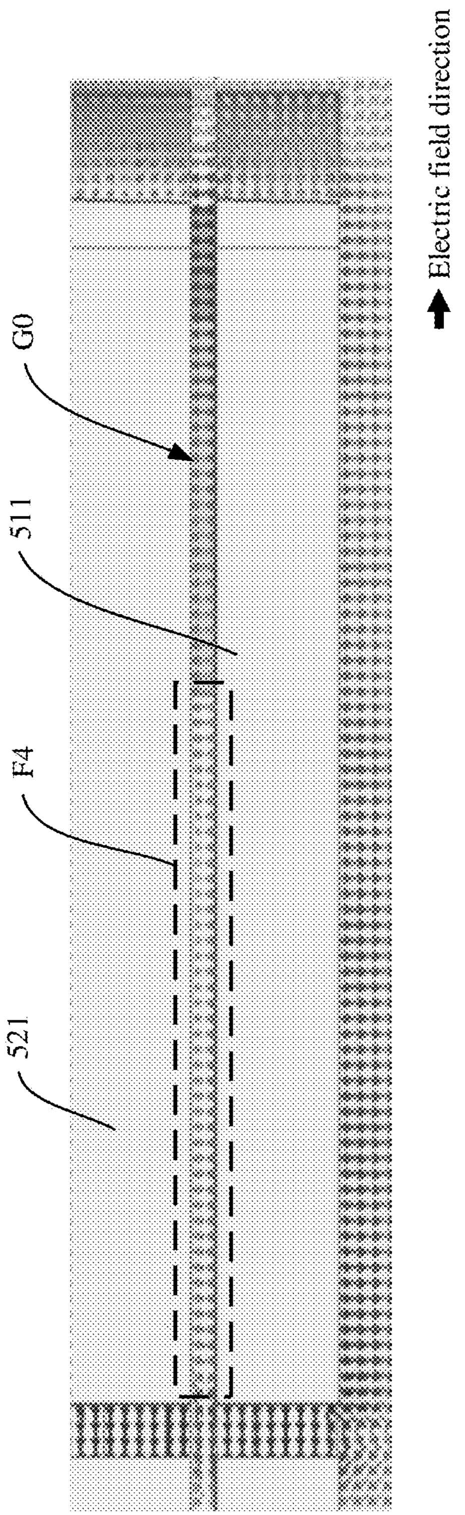
FIG. 17B is a simulation diagram of electric field distribution, presented from a first viewing angle V1 shown in FIG. 17A, of the structure shown in FIG. 17A in a case that the main antenna unit performs feeding.

FIG. 17A is a schematic diagram of a partial structure of an electronic device 100 that includes the antenna structure 50 shown in FIG. 9A and that is in a folded state. FIG. 17B is a simulation diagram of electric field distribution, presented from a first viewing angle V1 (a side viewing angle of the electronic device 100), of the structure shown in FIG. 17A that is obtained by performing a simulation effect test in a case that the main antenna unit 51 performs feeding. It can be seen from FIG. 17B that, in the folded state, in an area shown in a dashed-line box F5 in FIG. 17B, electric fields generated by the radiation stub 511 and the parasitic stub 521 in the gap G0 between the radiation stub 511 and the parasitic stub 521 have opposite directions.

From comparison between an electric field in an area shown in a dashed-line box F5 in FIG. 7B and the electric field in the area shown in the dashed-line box F4 in FIG. 17B, it may be learned that in the folded state, after the parasitic antenna unit 52 is constructed, the electric fields with the same direction that are distributed in some areas in the gap G0 between the radiation stub 511 and the parasitic stub 521 become electric fields with opposite directions.

With reference to the principle diagram of current and electric field distribution shown in FIG. 11, the simulation diagram of current distribution shown in FIG. 16, and the simulation diagram of electric field distribution shown in FIG. 17B, it can be seen that, in the folded state, current directions in some areas on the two overlapping conductors (the radiation stub 511 and the parasitic stub 521) are opposite, and electric fields generated by the two conductors in some areas in the gap G0 between the two conductors are opposite. This current and electric field distribution characteristic is similar to a current and electric field distribution characteristic on two conductors in an antenna mode, so that radiation currents on the two conductors can be superimposed in a same direction. Therefore, an antenna can be enabled to have better radiation performance, and communication performance of the electronic device 100 can be improved.

Figure 18:
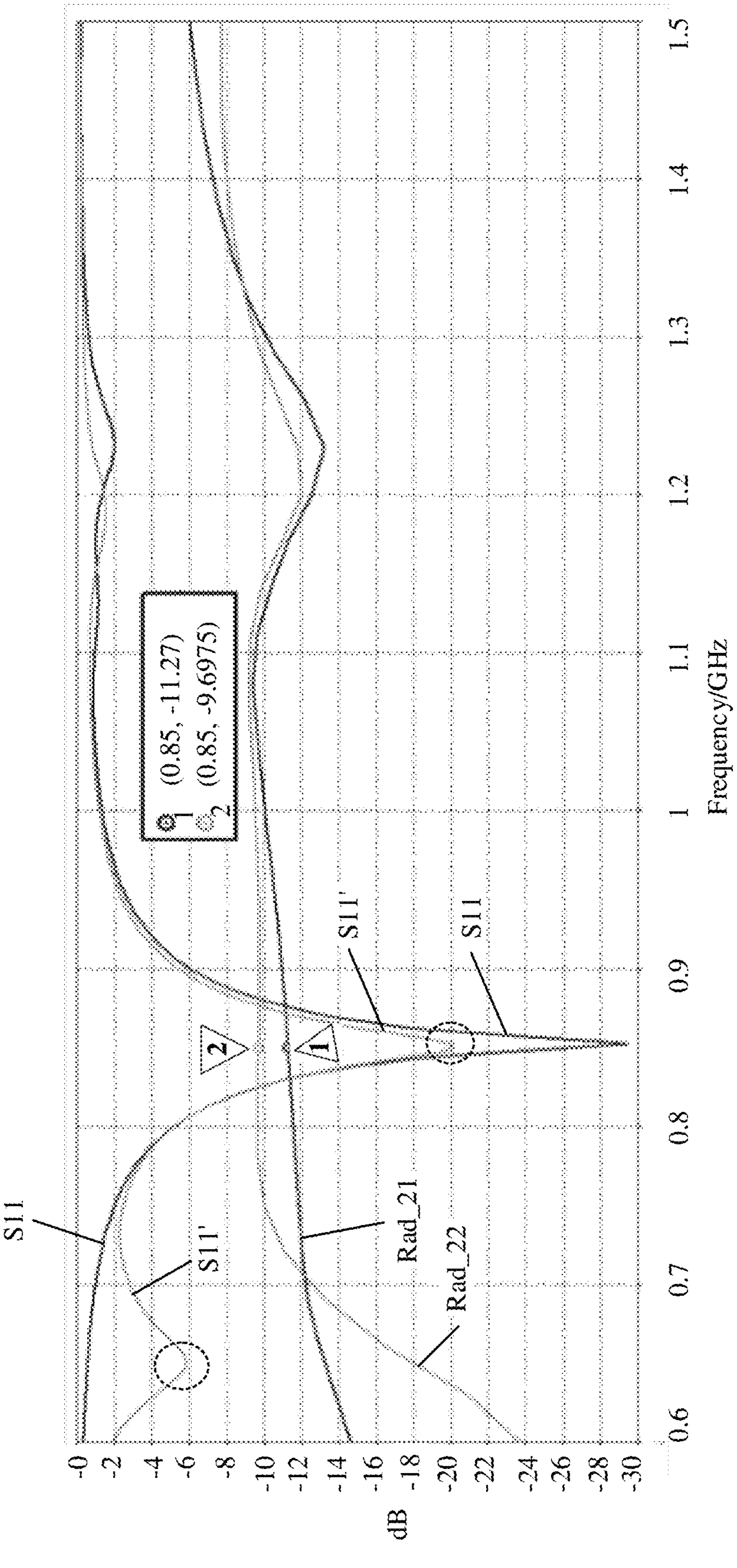
FIG. 18 is a schematic diagram of S-parameter curves of the low-frequency antenna shown in FIG. 4A and the antenna structure shown in FIG. 9A in a case that the electronic device is in a folded state.

FIG. 18 is a schematic diagram of S-parameter curves of the low-frequency antenna 41 shown in FIG. 4A and the antenna structure 50 shown in FIG. 9A in a case that the electronic device 100 is in a folded state. The ground return structure 523 of the parasitic antenna unit 52 includes a zero-ohm resistor, that is, the ground return port 522 of the parasitic stub 521 is grounded by using the zero-ohm resistor. A reference sign S11 is used to indicate a reflection coefficient curve of the low-frequency antenna 41 shown in FIG. 4A in a case that the electronic device 100 is in the folded state, and a reference sign S11' is used to indicate a reflection coefficient curve of the antenna structure 50 shown in FIG. 9A in a case that the electronic device 100 is in the folded state. A reference sign Rad_21 is used to indicate a radiation efficiency curve of the low-frequency antenna 41 shown in FIG. 4A in a case that the electronic device 100 is in the folded state. A reference sign Rad_22 is used to indicate a radiation efficiency curve of the antenna structure 50 shown in FIG. 9A in a case that the electronic device 100 is in the folded state.

It may be seen from FIG. 18 that main resonance frequencies of the low-frequency antenna 41 and the main antenna unit 51 are both the 0.85 GHz frequency on the B5 frequency band. It can be learned that, after the parasitic antenna unit 52 is added, constructing the parasitic antenna unit 52 on the second body 12 of the electronic device 100 does not affect the main resonance frequency of the main antenna unit 51.

After the parasitic antenna unit 52 is added, new resonance further occurs at a 0.65 GHz frequency. This is parasitic resonance generated by the parasitic antenna unit 52. In other words, the resonance frequency of the parasitic antenna unit 52 is at the 0.65 GHz frequency. It can be learned that the resonance frequency of the parasitic antenna unit 52 is close to and slightly less than the main resonance frequency of the main antenna unit 51.

In addition, in a case of a same radiation space and a same structure of the low-frequency antenna 41, at the 0.85 GHz frequency, the radiation efficiency of the low-frequency antenna 41 is −11.27 dB before the parasitic antenna unit 52 is added, and the radiation efficiency of the main antenna unit 51 increases to −9.70 dB after the parasitic antenna unit 52 is added. The radiation efficiency is increased by about 1.6 dB. It can be learned that, the parasitic antenna unit 52 is added to the second body 12 of the electronic device 100, and the resonance frequency of the parasitic antenna unit 52 is set to be close to and slightly less than the main resonance frequency of the main antenna unit 51, thereby improving performance of the main antenna unit 51 (a low-frequency antenna) on a low-frequency band.

It may be understood that, when the resonance frequency of the main antenna unit 51 is adjusted to another frequency band, for example, the B28 frequency band or the B8 frequency band, by using the first tuning unit 514, the resonance frequency of the parasitic antenna unit 52 may also be correspondingly adjusted by using the second tuning unit 524, so as to ensure that the radiation efficiency of the main antenna unit 51 can be improved in a case that the electronic device 100 is in the folded state.

It can be learned from the foregoing descriptions that, in the foldable electronic device 100 provided in this application, for a characteristic that a radiation current in an opposite direction is generated on the radiation stub 511 of the main antenna unit 51, the parasitic antenna unit 52 overlapping the main antenna unit 51 in the folded state is constructed and the parasitic antenna unit 52 is constructed into an antenna structure that can enable, when being excited, a current generated in the main radiation area of the parasitic stub 521 and a current generated in at least some areas of the radiation stub 511 of the main antenna unit 51 to have a same direction, to reduce a radiation energy loss of the main antenna unit 51 by using the currents superimposed in the same direction, and further effectively improve radiation efficiency of the main antenna unit 51 operating in a low frequency band and improve communication performance of the electronic device 100.

The foregoing descriptions are merely specific implementations of this application, but the protection scope of this application is not limited thereto. Any person skilled in the art can easily conceive changes or replacement solutions within the technical scope disclosed in this application, and these changes or replacement solutions shall all fall within the protection scope of this application. Therefore, the protection scope of this application shall be subject to the protection scope of the claims.

What is claimed is:

1. A foldable electronic device, comprising:

a first body and a second body, wherein the first body and the second body are connected to each other and are capable of being relatively folded or unfolded;

a main antenna unit, disposed on the first body, wherein the main antenna unit comprises a radiation stub, a feeding port, and a ground port, and the feeding port is configured to feed the radiation stub; and the radiation stub comprises a first end and a second end, and the ground port is disposed between the first end and the second end of the radiation stub; and a parasitic antenna unit, disposed on the second body, wherein the parasitic antenna unit comprises a parasitic stub and a ground return port, the parasitic stub comprises a first end portion and a second end portion, and the ground return port is disposed on the parasitic stub and is close to or located at one of the end portions of the parasitic stub; and when the electronic device is in a folded state, the parasitic stub overlaps the radiation stub; wherein when the electronic device is in the folded state and the main antenna unit performs feeding, the main antenna unit is coupled to the parasitic antenna unit, so that a current generated on the parasitic stub is in a same direction as a current generated in at least some areas of the radiation stub, wherein both the first end and the second end of the radiation stub of the main antenna unit are open-circuit ends; and when the electronic device is in the folded state, the first end portion of the parasitic stub is disposed opposite to the first end of the radiation stub, and the second end portion of the parasitic stub is disposed opposite to the second end of the radiation stub.

2. The foldable electronic device according to claim 1, wherein the radiation stub comprises a first radiation area located between the ground port and the first end of the radiation stub and a second radiation area located between the ground port and the second end of the radiation stub;

the ground return port of the parasitic antenna unit is close to or located at the second end portion of the parasitic stub, and the parasitic stub comprises a main radiation area located between the ground return port and the first end portion of the parasitic stub; and when the electronic device is in the folded state and the main antenna unit performs feeding, the main antenna unit is coupled to the parasitic antenna unit, so that a current generated in the main radiation area of the parasitic stub is in a same direction as a current generated in the first radiation area of the radiation stub.

3. The foldable electronic device according to claim 2, wherein a resonance frequency of the parasitic antenna unit is less than a resonance frequency of the main antenna unit.

4. The foldable electronic device according to claim 3, wherein a main resonant mode of the main antenna unit is a ½ wavelength common-mode resonant mode, and a resonant mode of the parasitic antenna unit is a ¼ wavelength resonant mode.

5. The foldable electronic device according to claim 2, wherein the parasitic antenna unit further comprises a ground return structure electrically connected to the ground return port of the parasitic stub, the ground return port of the parasitic stub is grounded by using the ground return structure, and the ground return structure is configured to construct a low-impedance boundary on the parasitic stub; and the ground return structure is a low-impedance circuit comprising several passive devices; or the ground return structure comprises a plurality of low-impedance circuits disposed in parallel and switch devices electrically connected to the plurality of low-impedance circuits, wherein each low-impedance circuit comprises several passive devices, and the switch devices are configured to control connected/disconnected states of the plurality of low-impedance circuits; wherein the passive device comprises a zero-ohm resistor, a large capacitor, or a small inductor.

6. The foldable electronic device according to claim 1, wherein the radiation stub comprises a first radiation area located between the ground port and the first end of the radiation stub and a second radiation area located between the ground port and the second end of the radiation stub;

the ground return port of the parasitic antenna unit is close to or located at the first end portion of the parasitic stub, and the parasitic stub comprises a main radiation area located between the ground return port and the second end portion of the parasitic stub; and when the electronic device is in the folded state and the main antenna unit performs feeding, the main antenna unit is coupled to the parasitic antenna unit, so that a current generated in the main radiation area of the parasitic stub is in a same direction as a current generated in the second radiation area of the radiation stub.

7. A foldable electronic device, comprising:

a first body and a second body, wherein the first body and the second body are connected to each other and are capable of being relatively folded or unfolded;

a main antenna unit, disposed on the first body, wherein the main antenna unit comprises a radiation stub, a feeding port, and a ground port, and the feeding port is configured to feed the radiation stub; and the radiation stub comprises a first end and a second end, and the ground port is disposed between the first end and the second end of the radiation stub; and a parasitic antenna unit, disposed on the second body, wherein the parasitic antenna unit comprises a parasitic stub and a ground return port, the parasitic stub comprises a first end portion and a second end portion, and the ground return port is disposed on the parasitic stub and is close to or located at one of the end portions of the parasitic stub; and when the electronic device is in a folded state, the parasitic stub overlaps the radiation stub; wherein when the electronic device is in the folded state and the main antenna unit performs feeding, the main antenna unit is coupled to the parasitic antenna unit, so that a current generated on the parasitic stub is in a same direction as a current generated in at least some areas of the radiation stub; and a resonance frequency of the parasitic antenna unit is less than a resonance frequency of the main antenna unit, wherein both the first end and the second end of the radiation stub of the main antenna unit are open-circuit ends; and when the electronic device is in the folded state, the first end portion of the parasitic stub is disposed opposite to the first end of the radiation stub, and the second end portion of the parasitic stub is disposed opposite to the second end of the radiation stub.

8. The foldable electronic device according to claim 7, wherein the radiation stub comprises a first radiation area located between the ground port and the first end of the radiation stub and a second radiation area located between the ground port and the second end of the radiation stub;

the ground return port of the parasitic antenna unit is close to or located at the second end portion of the parasitic stub, and the parasitic stub comprises a main radiation area located between the ground return port and the first end portion of the parasitic stub; and when the electronic device is in the folded state and the main antenna unit performs feeding, the main antenna unit is coupled to the parasitic antenna unit, so that a current generated in the main radiation area of the parasitic stub is in a same direction as a current generated in the first radiation area of the radiation stub.

9. The foldable electronic device according to claim 8, wherein a main resonant mode of the main antenna unit is a ½ wavelength common-mode resonant mode, and a resonant mode of the parasitic antenna unit is a ¼ wavelength resonant mode.

10. The foldable electronic device according to claim 8, wherein the parasitic antenna unit further comprises a ground return structure electrically connected to the ground return port of the parasitic stub, the ground return port of the parasitic stub is grounded by using the ground return structure, and the ground return structure is configured to construct a low-impedance boundary on the parasitic stub; and the ground return structure is a low-impedance circuit comprising several passive devices; or the ground return structure comprises a plurality of low-impedance circuits disposed in parallel and switch devices electrically connected to the plurality of low-impedance circuits, wherein each low-impedance circuit comprises several passive devices, and the switch devices are configured to control connected/disconnected states of the plurality of low-impedance circuits; wherein the passive device comprises a zero-ohm resistor, a large capacitor, or a small inductor.

11. The foldable electronic device according to claim 8, wherein the main antenna unit further comprises a first tuning unit electrically connected to the radiation stub, and the first tuning unit is configured to adjust the resonance frequency of the main antenna unit, so that the main antenna unit operates on a preset target frequency band; and the parasitic antenna unit further comprises a second tuning unit electrically connected to the parasitic stub, and the second tuning unit is configured to adjust the resonance frequency of the parasitic antenna unit, so that the resonance frequency of the parasitic antenna unit is less than the resonance frequency of the main antenna unit.

12. The foldable electronic device according to claim 7, wherein the radiation stub comprises a first radiation area located between the ground port and the first end of the radiation stub and a second radiation area located between the ground port and the second end of the radiation stub;

the ground return port of the parasitic antenna unit is close to or located at the first end portion of the parasitic stub, and the parasitic stub comprises a main radiation area located between the ground return port and the second end portion of the parasitic stub; and when the electronic device is in the folded state and the main antenna unit performs feeding, the main antenna unit is coupled to the parasitic antenna unit, so that a current generated in the main radiation area of the parasitic stub is in a same direction as a current generated in the second radiation area of the radiation stub.

13. The foldable electronic device according to claim 7, wherein the first body comprises a first metal bezel, and the second body comprises a second metal bezel; and the radiation stub is disposed on the first metal bezel, and the parasitic stub is disposed on the second metal bezel.

14. The foldable electronic device according to claim 13, wherein a first gap and a second gap are disposed on the first metal bezel, and a metal bezel between the first gap and the second gap forms the radiation stub of the main antenna unit, wherein the first end of the radiation stub is adjacent to the first gap, and the second end of the radiation stub is adjacent to the second gap; and a third gap and a fourth gap are disposed on the second metal bezel, and the parasitic stub of the parasitic antenna unit is formed on a metal bezel between the third gap and the fourth gap, wherein the first end portion of the parasitic stub is adjacent to the third gap, and the second end portion of the parasitic stub is adjacent to the fourth gap; wherein when the electronic device is in the folded state, the first gap is disposed opposite to the third gap, and the second gap is disposed opposite to the fourth gap.

15. The foldable electronic device according to claim 14, wherein the electronic device further comprises a connecting structure, and the first body and the second body are connected by using the connecting structure; the first metal bezel comprises a first connecting segment, a second connecting segment, and a third connecting segment, and the first connecting segment is disposed opposite to the connecting structure; and the second connecting segment and the third connecting segment each are connected to the first connecting segment, and each are located between the first connecting segment and the connecting structure.

16. The foldable electronic device according to claim 15, wherein the radiation stub each is like an L-shaped strip; and the first gap is disposed on the first connecting segment of the first metal bezel, and the second gap is disposed on the second connecting segment or the third connecting segment of the first metal bezel.

17. The foldable electronic device according to claim 16, wherein the feeding port is disposed on the first connecting segment; or when the second gap is disposed on the second connecting segment of the first metal bezel, the feeding port is disposed on the second connecting segment; or when the second gap is disposed on the third connecting segment of the first metal bezel, the feeding port is disposed on the third connecting segment.

18. The foldable electronic device according to claim 15, wherein the radiation stub is like a linear strip; and the first gap and the second gap both are disposed on the first connecting segment of the first metal bezel, or both are disposed on the second connecting segment of the first metal bezel, or both are disposed on the third connecting segment of the first metal bezel.

* * * * *